US012716267B2

(12) United States Patent
Lin et al.

(10) Patent No.: US 12,716,267 B2
(45) Date of Patent: Aug. 25, 2026

(54) ELECTRONIC LOCK AND A METHOD AND SYSTEM FOR CONTROLLING AN ELECTRONIC LOCK

(71) Applicant: IGLOOCOMPANY PTE. LTD., Singapore (SG)

(72) Inventors: Qiang Lin, Singapore (SG); Jingmao Lin, Singapore (SG); Shugen Zhu, Singapore (SG); Yung Lin Mah, Singapore (SG)

(73) Assignee: IGLOOCOMPANY PTE. LTD., Singapore (SG)

( * ) Notice: Subject to any disclaimer, the term of this patent is extended or adjusted under 35 U.S.C. 154(b) by 0 days.

(21) Appl. No.: 19/149,101

(22) PCT Filed: Jan. 19, 2024

(86) PCT No.: PCT/IB2024/050510

§ 371 (c)(1),
(2) Date: Jul. 18, 2025

(87) PCT Pub. No.: WO2024/154092

PCT Pub. Date: Jul. 25, 2024

(65) Prior Publication Data

US 2026/0110193 A1 Apr. 23, 2026

(30) Foreign Application Priority Data

Jan. 19, 2023 (CN) ......................... 202310057677.8
Jan. 19, 2023 (CN) ......................... 202310104399.7
(Continued)

(51) Int. Cl.
*E05B 37/00* (2006.01)
*E05B 47/00* (2006.01)

(52) U.S. Cl.
CPC .......... *E05B 37/0068* (2013.01); *E05B 47/00* (2013.01); *E05B 2047/0065* (2013.01); *E05B 2047/0067* (2013.01)

(58) Field of Classification Search
CPC ................. E05B 37/0068; E05B 47/00; E05B 2047/0065; E05B 2047/0067; G08B 29/188; G08B 19/00; G08B 29/181
(Continued)

(56) References Cited

U.S. PATENT DOCUMENTS 6,442,983 B1 * 9/2002 Thomas .............. E05B 47/0012 70/278.1
7,948,359 B2 * 5/2011 Marcelle ............ G07C 9/00182 70/38 A
(Continued)

FOREIGN PATENT DOCUMENTS

CN 206753270 U 12/2017
CN 113818758 A 12/2021
(Continued)

*Primary Examiner* — Nam V Nguyen

(57) ABSTRACT

The present disclosure generally relates to an electronic lock and a method and system for controlling an electronic lock. Particularly, it relates to a waterproof electronic lock including a lock body and a shackle for latching and unlatching relative to the lock body. The lock body comprises a front cover and a rear cover that is removably detachable from the front cover to form a hollow cavity within; and a central frame disposed within the hollow cavity, the central frame having a recess and a circumferential groove around the recess. The waterproof electronic lock comprises an input interface frame having a top surface and a bottom surface, the input interface frame including a first circumferential projection on the bottom surface that corresponds to fit the circumferential groove.

15 Claims, 28 Drawing Sheets

(30) Foreign Application Priority Data

Jan. 19, 2023 (CN) ......................... 202320112380.2
Jan. 19, 2023 (CN) ......................... 202320113934.0

(58) Field of Classification Search
USPC ........................................ 340/7.32, 7.33, 5.2
See application file for complete search history.

(56) References Cited

U.S. PATENT DOCUMENTS

| | | | | |
|---|---|---|---|---|
| 8,164,419 | B2 * | 4/2012 | Fisher | G07C 9/0069 340/5.73 |
| 9,670,694 | B2 * | 6/2017 | Larson | E05B 67/00 |
| 9,830,760 | B2 * | 11/2017 | Fisher | G07C 9/00309 |
| 10,176,656 | B2 * | 1/2019 | Gengler | G07C 9/00571 |
| 11,715,339 | B1 * | 8/2023 | Hilmas | G07C 9/215 340/5.61 |
| 12,167,293 | B2 * | 12/2024 | Bartucci | G07C 9/00857 |
| 12,424,081 | B2 * | 9/2025 | Wright | G08B 13/19602 |
| 2013/0255335 | A1 * | 10/2013 | Jonely | H02J 7/855 70/277 |
| 2019/0180541 | A1 | 6/2019 | Gengler et al. | |
| 2020/0402741 | A1 | 12/2020 | Huang | |

FOREIGN PATENT DOCUMENTS

| | | | |
|---|---|---|---|
| CN | 219497974 | U | 8/2023 |
| CN | 219605069 | U | 8/2023 |
| FR | 3066214 | A1 | 11/2018 |

* cited by examiner

ELECTRONIC LOCK AND A METHOD AND SYSTEM FOR CONTROLLING AN ELECTRONIC LOCK

TECHNICAL FIELD

The present disclosure generally relates to electronic lock systems. More particularly, the present disclosure relates to an electronic lock, and a method and system for controlling an electronic lock.

BACKGROUND

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

As electronic locks with intelligent features become increasingly popular, their storage and transportation methods significantly impact their subsequent usage and lifespan. Currently, one transportation method involves disassembling the power source from the smart lock for transport, then reinstalling it when the user is ready to use the lock. The other method involves transporting the smart lock in a low-power mode, ready to be activated into normal working mode at any time.

However, both methods have significant drawbacks. In the first method, the power source is stored separately from the smart lock during transport, making it susceptible to damage. Additionally, improper installation by the user can cause accidental damage to the control circuit and the power source within the smart lock's body, and potentially compromise the lock's sealing function.

In the second method, issues such as packaging pressure and manual handling errors during transport can inadvertently end the lock's low-power mode, causing it to enter normal working mode prematurely. This can result in the electronic lock reaching the user with a depleted power source or unnecessary power source consumption, thereby shortening its subsequent service life.

Electronic locks possess features such as intelligent management and analysis systems due to the use of microprocessors. However, some parts of the electronic locks, such as the printed circuit board (PCB) and motor, are not water-resistant, and they are often exposed to outdoor conditions, such as wind, frost, rain and snow. It is important for electronic locks, such as electronic padlocks that are used for securing valuable and critical assets on the move or in areas exposed to environmental elements, to have good waterproof performance, so that they can work normally for a long time. If the watersensitive parts of the electronic locks are wet, they may cause short circuits. Current electronic locks do not have high waterproof performance, and this affects the service life and reliability of the electronic locks, which makes them prone to damage due to short circuits. Hence, there is a need address the aforesaid problems with current electronic locks and to help extend the service life, enhance the reliability and expand the use of electronic locks in outdoor environments.

While a small portion of the electronic lock is designed with a replaceable power source structure, it typically requires professional intervention for replacement, which can be time-consuming and labor-intensive. The replacement process often necessitates the application of destructive force to the power source's structure, which can compromise the power source's sealing performance. This damage is unavoidable and can lead to potential water intrusion into the electronic lock, causing the power source to short circuit and potentially burn out the PCB board connected to the power source. This not only affects the lifespan of the electronic lock but also reduces its reliability.

Hence, there is an urgent need for various solutions that aim to address the problems of preventing accidental damage to the electronic lock power source during storage and transportation and avoiding unnecessary power source consumption. Additionally, there is a need to improve the waterproofing property in electronic locks in outdoor environments, and it is also required to address the problem of power source replacement and maintaining the power source's sealing integrity, extends the lifespan, and enhancing the reliability of the power components and electronic locks.

Accordingly, the present invention attempts to address or to overcome at least some of the aforementioned problems.

SUMMARY OF THE INVENTION

In accordance with a first aspect of the invention, there is disclosed a waterproof electronic lock, the electronic lock including a lock body and a shackle for latching and unlatching relative to the lock body.

According to various embodiments, the lock body comprises a front cover and a rear cover that is removably detachable from the front cover to form a hollow cavity within; and a central frame disposed within the hollow cavity, the central frame having a recess and a circumferential groove around the recess.

According to various embodiments, the lock body comprises an input interface frame having a top surface and a bottom surface, the input interface frame including a first circumferential projection on the bottom surface that corresponds to fit the circumferential groove.

According to various embodiments, the lock body comprises a keypad plate having a bottom plate surface facing the input interface frame and a top plate surface having a plurality of key bosses, wherein each key boss has a column on the bottom plate surface that extends to the bottom plate surface.

According to various embodiments, the keypad plate includes a second circumferential projection on the top plate surface and the front cover has an opposing surface including a circumferential recess facing the top plate surface of the keypad plate, wherein the second circumferential projection is configured to fit into the circumferential recess.

According to various embodiments, the recess further includes a cable opening, a sound opening, and a PCB board having a speaker, wherein a waterproof membrane covers the sound opening.

According to various embodiments, the lock body further includes a charging port provided at the bottom of the central frame, and a waterproof pressure plate comprising a protrusion that engageable with the charging port.

According to various embodiments, the lock body further includes a sealed plug that is detachably connected to the charging port, wherein the sealed plug comprises a cover plate and an anti-detachment rod and a plug head that are provided on the side of the cover plate facing the charging port.

In accordance with a second aspect of the invention, there is disclosed a method for controlling an electronic lock, the electronic lock including a lock body, a locking mechanism for latching and unlatching relative to the lock body for locking and unlocking respectively, a power source, a charging interface for charging the power source, and a controller in communication with the locking mechanism, power source and the charging interface. The method includes determining if a time duration of power source in the lock body meets a first predetermined time duration, wherein if the time duration of power source meets the first predetermined time duration, the electronic lock enters an ultra-low power mode, determining if a number of activation and deactivation of the electronic lock in the ultra-low power mode meets a predetermined number of times; wherein if the predetermined number of times are met, the electronic lock enters a wake up mode, and determining if a pairing operation between the electronic lock and a control device is completed within a second predetermined time duration, wherein if the second predetermined time duration is met, the electronic lock enters a work mode.

According to various embodiments, the electronic lock further includes a shackle for latching and unlatching relative to the lock body, wherein the activation is associated with latching of the shackle for locking and the deactivation is associated with the unlatching of the shackle for unlocking.

According to various embodiments, the activation is associated with plugging an external charging plug in communication with an external source receiver into the charging interface, and the deactivation is associated with unplugging the external charging plug from the charging interface.

According to various embodiments, the electronic lock further comprises a magnet located on the shackle, a magnetic sensor located within the lock body for detecting a change in magnetic inductance intensity when the shackle moves relative to the lock body; and a detection module in communication with the magnetic sensor for determining the number of activations and deactivations associated with the latching and unlatching of the shackle respectively, wherein a change in magnetic inductance intensity is associated with the number of activations and deactivations.

According to various embodiments, the electronic lock includes a detection module in communication with the charging interface for determining if the number of activations and deactivations meets the predetermined number of times, wherein the predetermined number of times is associated with the number of plugging and unplugging of the charging plug into and from the charging interface respectively.

According to various embodiments, the electronic lock comprises a pairing detection module in communication with the controller for determining if the time taken to complete the pairing operation of the electronic lock is less than or equal to the second predetermined time duration.

According to various embodiments, the first and second predetermined time duration is 1 minute and the predetermined number of times is 3.

In accordance with a third aspect of the invention, there is provided a system for controlling an electronic lock, the electronic lock including a lock body, a locking mechanism for latching and unlatching relative to the lock body for locking and unlocking respectively, a power source, a charging interface for charging the power source, and a controller in communication with the locking mechanism, power source and charging interface, wherein the system comprises a power source module in communication with the power source and a timing module, wherein the timing module configured to determine a first time duration of power source in the lock body, a detection module configured to determine a number of activation and deactivation of the electronic lock, a pairing detection module configured to determine a second time duration for a pairing operation between the electronic lock and a control device, an operation mode module configured to cause the electronic lock to enter an ultra-low power mode, a wake up mode and a working mode based on the determination of the timing module, detection module and the pairing detection module and a controller in communication with the timing module, the detection module, the pairing detection module and the operation mode module. The controller is configured to determine if the first time duration of power source in the lock body meets a first predetermined time duration, wherein if the time duration of power source meets the first predetermined time duration, the electronic lock enters an ultra-low power mode, determine if the number of activations and deactivations of the electronic lock meets a predetermined number of times, wherein if the predetermined number of times are met, the electronic lock enters a wake up mode, and determine if the second time duration for the piring operation is completed within a second predetermined time duration, wherein if the second predetermined time duration is met, the electronic lock enters a work mode.

According to various embodiments, the electronic lock further includes a shackle for latching and unlatching relative to the lock body, wherein the activation is associated with latching of the shackle for locking and the deactivation is associated with the unlatching of the shackle for unlocking.

According to various embodiments, the activation is associated with plugging an external charging plug in communication with an external source receiver into the charging interface, and the deactivation is associated with unplugging the external charging plug from the charging interface.

According to various embodiments, the electronic lock further comprises a magnet located on the shackle, a magnetic sensor located within the lock body for detecting a change in magnetic inductance intensity when the shackle moves relative to the lock body; wherein the detection module in communication with the magnetic sensor is configured to determine the number of activation and deactivation associated with the latching and unlatching of the shackle respectively, wherein a change in magnetic inductance intensity is associated with the number of activation and deactivation.

According to various embodiments, the detection module is in communication with the charging interface for determining if the number of activation and deactivation meets the predetermined number of times, wherein the predetermined number of times is associated with the number of plugging and unplugging of the external charging plug into and from the charging interface respectively.

According to various embodiments, the first and second predetermined time duration is 1 minute and the predetermined number of times is 3.

According to various embodiments, the controller comprises a signal input end and a signal output end, wherein the power source module, the timing module, the detection module and the pairing operation module are connected to the signal input end, and the operation mode module is connected to the signal output end.

According to various embodiments, the electronic lock further includes a frame including a base having four walls extending upwardly from the base to define a compartment for receiving a power source enclosure, each wall having a top edge and a bottom edge, wherein the bottom edge is connected to one of the sides of the base, and the top edge includes a recess that extends longitudinally along the top edge so that the recess extends along the perimeter of the top edge of the frame, a compartment pad including a projection configured to provide a corresponding fit for the recess, a compartment cover configured to be placed over the compartment pad, wherein the compartment pad, the compartment cover and the frame includes a plurality of aligned holes configured to secure the compartment pad and compartment cover to the frame via fasteners.

According to various embodiments, the lock body further comprises a front cover and a rear cover that is removably detachable from the front cover to form a hollow cavity within, a central frame disposed within the hollow cavity, the central frame having a recess and a circumferential groove around the recess, an input interface frame having a top surface and a bottom surface, the input interface frame including a first circumferential projection on the bottom surface that corresponds to fit the circumferential groove.

In accordance with a fourth aspect of the invention, there is provided an electronic lock comprising a lock body, a shackle for latching and unlatching relative to the lock body for locking and unlocking respectively, a power source, a charging interface for charging the power source, and a controller in communication with the locking mechanism, power source and charging interface, at least one processor and at least one memory, the memory storing computer program instructions, the power source electrically connected to the processor, when the computer program instructions are executed by the processor to implement the method above.

In accordance with a fifth aspect of the invention, there is provided a power supply component for an electronic lock, the electronic lock comprising a lock body, a locking mechanism for latching and unlatching relative to the lock body for locking and unlocking respectively, comprising a frame including a base having four walls extending upwardly from the base to define a compartment for receiving a power source enclosure, each wall having a top edge and a bottom edge, wherein the bottom edge is connected to one of the sides of the base, and the top edge includes a recess that extends longitudinally along the top edge so that the recess extends along the perimeter of the top edge of the frame, a compartment pad including a projection configured to provide a corresponding fit for the recess, a compartment cover configured to be placed over the compartment pad, wherein the compartment pad, the compartment cover and the frame includes a plurality of aligned holes configured to secure the compartment pad and compartment cover to the frame via fasteners.

According to various embodiments, the plurality of aligned holes are located on protrusions extending from the compartment pad, the compartment cover and the frame.

According to various embodiments, the compartment cover includes a first side facing the compartment pad and a second side facing away from the compartment pad, wherein the first side has two or more sealing ribs near the edge of the compartment cover.

According to various embodiments, the compartment pad has a pull out protrusion located on a corner of the compartment pad.

According to various embodiments, the power source enclosure includes a power source circuit board in electrical communication with a power source, a first cover and a second cover that is removably detachable from the first cover, wherein the power source and the power source circuit board are housed in the first and second cover.

According to various embodiments, the first cover includes a charging interface for receiving an external power supply that is exposed on the exterior of the first cover.

According to various embodiments, the second cover has a plurality of contact holes on its outer surface configured for the power source to be in electrical communication with the locking mechanism, an electric contact plate including electric contacts corresponding to the plurality of contact holes for contact with a controller of the electronic lock.

According to various embodiments, the first cover has a display indicator including a display light corresponding to the display indicator, wherein the display light is used to display the working status of the power source.

BRIEF DESCRIPTION OF DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1:
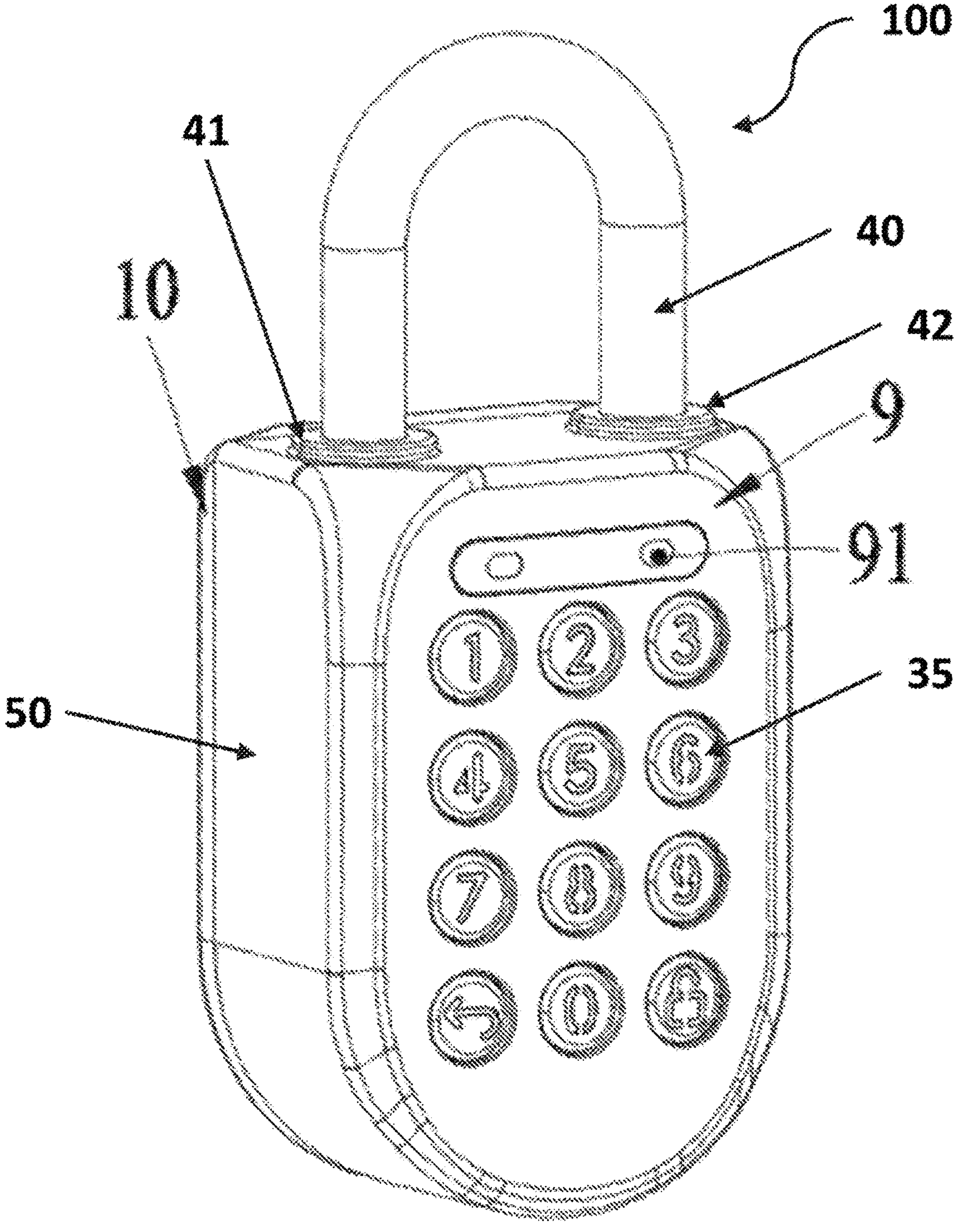
FIG. 1 illustrates a perspective view of an exemplary electronic lock according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Accordingly, in one or more example embodiments, the functions described may be implemented in hardware, software, or any combination thereof. If implemented in software, the functions may be stored on or encoded as one or more instructions or code on a computer-readable medium.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Certain terminology used in the description is for convenience in reference only and shall not be limiting. For example, up, down, front, back, right, and left refer to the disclosed subject matter as orientated in the view being referred to. The words, "inwardly" and "outwardly" refer to directions toward and away from, respectively, the geometric center of the aspect being described and designated parts thereof. The terminology will include the words specifically mentioned, derivatives thereof, and words of similar meaning. Like references numbers denote like features, components, or elements throughout the various embodiments.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In order that the invention may be readily understood and put into practical effect, particular embodiments will now be described by way of examples and not limitations, and with reference to the figures. It will be understood that any property described herein for a specific system may also hold for any system described herein. It will be understood that any property described herein for a specific method may also hold for any method described herein. Furthermore, it will be understood that for any system or method described herein, not necessarily all the components or steps described must be enclosed in the system or method, but only some (but not all) components or steps may be enclosed.

To achieve the stated features, advantages and objects, the present disclosure described herein disclose an electronic lock and a method and a system of controlling an electronic lock with the objectives of extending the service life, enhancing the reliability and expanding the use of electronic locks in outdoor environments.

FIG. 1 illustrates a perspective view of an exemplary electronic lock which is provided with a mechanical numerical keypad interface 9 having physical buttons 35 with a series of sequential numbers for a user to physically depress. The term 'electronic lock' is broadly intended to include any type of lockset that uses electrical power in some manner, including but not limited to electronic deadbolts, electronic lever sets, electronic door locksets, and padlocks. Referring to FIG. 1, the electronic lock 100, for example an electronic padlock, includes a lock body 50 and a shackle 40. The lock body 50 includes a front cover 9 and a rear cover 10 that is removably detachable from the front cover 9. The shackle 40 is designed to latch and unlatch relative to the lock body 50, enabling locking and unlocking. The lock body is equipped with a charging interface. The charging interface can be but not limited to a USB interface, or other types of suitable charging interfaces, for example, a power adapter. The electronic lock includes an input interface 35, such as a mechanical keypad. In one embodiment, one or more numerical indicia (such as sequential numbers) may be provided on the input interface 35, and each numerical indicia is represented by a physical button 35 for a user to depress. The electronic padlock 100 includes a first shackle recess 41 and a second shackle recess 42 extending from an upper end of the lock body 50. The shackle 40 has a first and second leg, one of which is longer than the other. The shackle recesses 41, 42 receive the first and second legs of a generally U-shaped shackle 40. Each shackle recess 41, 42 includes a ring seal so that when the shackle is moving from an extended position to a retracted position or vice versa, the ring seal prevents water from getting into the front cover 9. In one embodiment, the ring seal is an O-ring or any other suitable seal. The input interface 35 allows a user to depress a passcode indicated by a series of pre-set numbers to operate a locking mechanism within the electronic lock 100, to allow axial movement of the shackle 40 from a retracted position to an extended position, such that the short leg of the shackle 40 may be disengaged or withdrawn from the lock body 50 to open the electronic lock 100. In one embodiment, the front cover 9 also has an indicator display 91, and the electronic lock has a controller that connects to a power source 21. The power source includes but is not limited to rechargeable battery, a battery, fuel cells, energy harvesters or other suitable power sources. The controller has a display light that corresponds with the indicator display hole 91. The indicator display 91 shows the power source's status, such as low power or drained. This helps the user know how much power source is left and to change it when needed. It also prevents the user from thinking the electronic lock is broken when the power source runs out of power.

Figure 2:
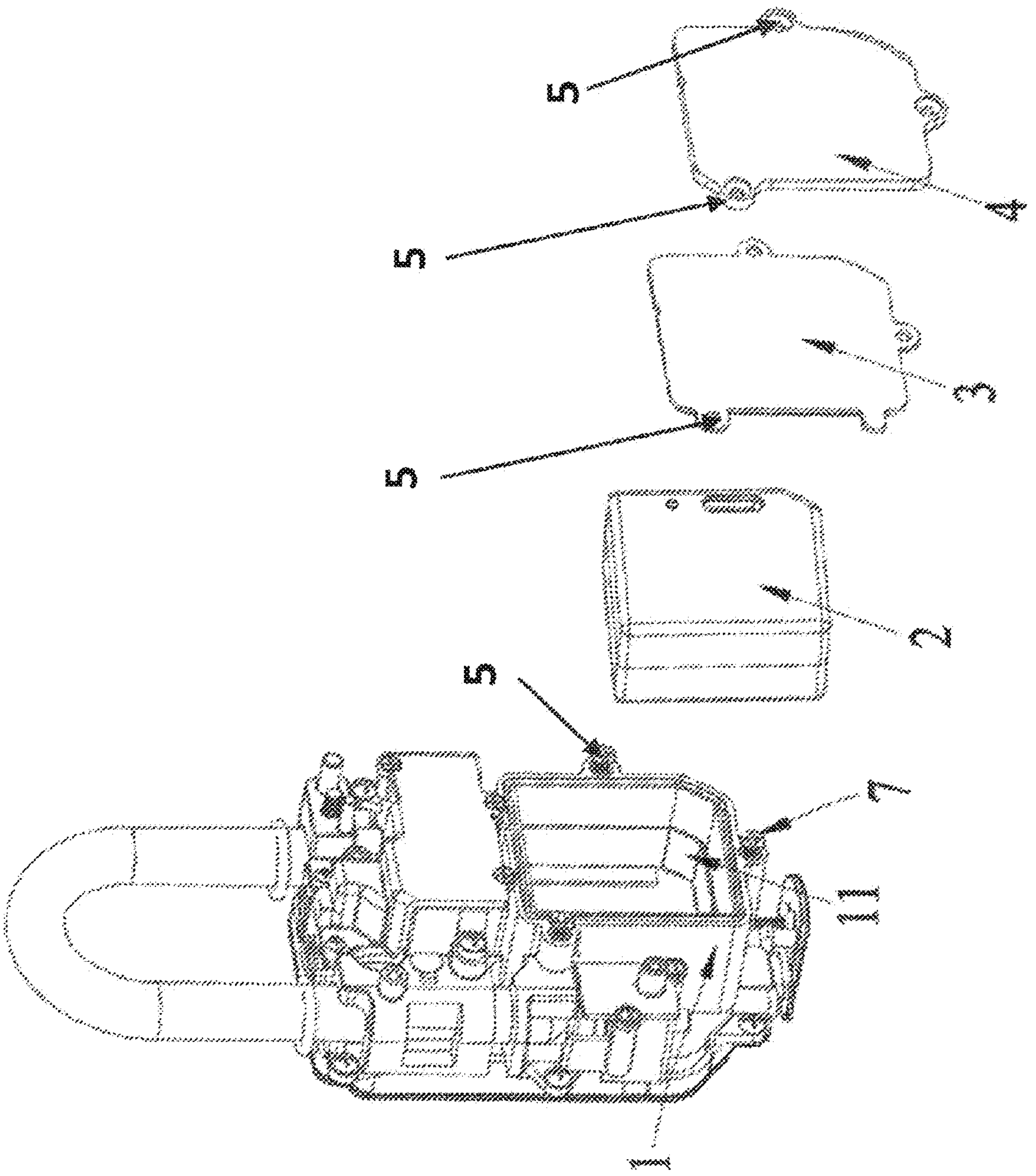
FIG. 2 illustrates an exploded perspective view of an electronic lock and its internal components according to various embodiments.

FIG. 2 illustrates an exploded perspective view of an electronic lock and its internal components. Referring to FIG. 2, and for the purpose of illustration, the electronic lock 100 has its rear cover 10 removed to reveal its internal components. The electronic lock 100 includes a power source assembly comprising a frame 1, a power source enclosure 2 for enclosing a power source 21, a compartment pad 3 and a compartment cover 4. The frame 1 includes a compartment 11 that is configured for receiving the replaceable power source 2 and includes one or more connectors in the frame 1 for connecting the power source 2 to the locking mechanism. The compartment pad 3 is configured to seal the frame 1 once the power source 2 has been installed in the frame. The compartment cover 4 is placed on top of the compartment pad 3. The compartment pad 3 and the compartment cover 4 includes mutually aligned holes that facilitate the placement of compartment cover 4 over compartment pad 3 in order to secure compartment cover 4 on compartment pad 3.

Figure 3:
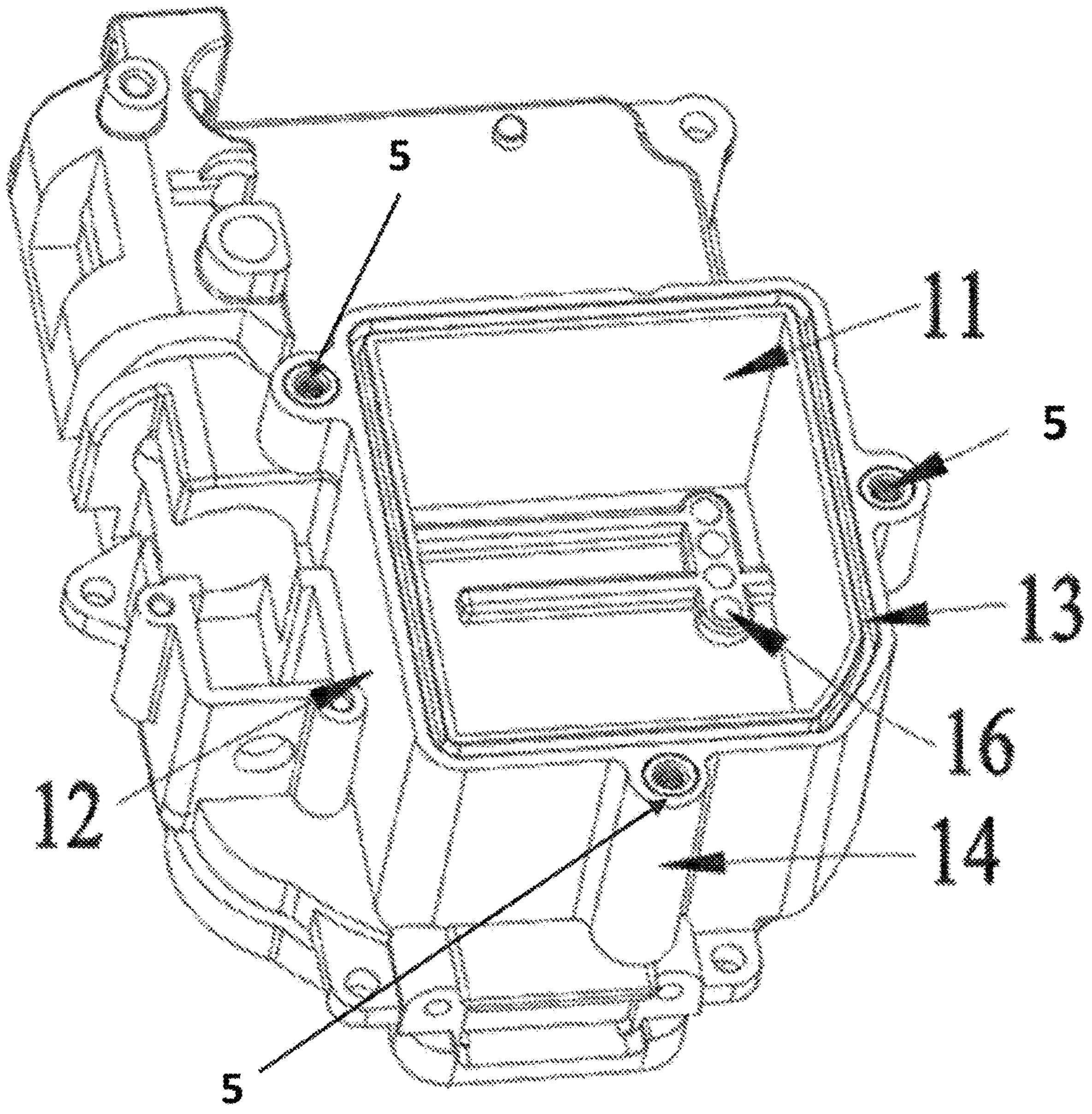
FIG. 3 illustrates a perspective view of a power source assembly of the electronic lock according to various embodiments.

FIG. 3 illustrates a perspective view of the power source assembly according to various embodiments. The frame 1 includes a base a base having four walls 12 extending upwardly from the base to define a compartment or a cavity for receiving a replaceable power source. Each wall 12 has a top edge and a bottom edge and the bottom edge is connected to one of the sides of the base, and the top edge includes a recess or a groove that extends longitudinally along the top edge so that the recess extends along the perimeter of the top edge of the frame. The walls 12 are connected in sequence to form a shape. The shape, can for example, be a square or any other desired shape. Each wall 12 has a top edge, and within the top edge of each wall, a recess 13 surrounds the perimeter of the top edge of the frame 1. The power source enclosure 2 is removable from the compartment 11. The compartment pad 3 has bottom surface that includes a boss 31 that fits snugly with the groove 13 by interference fit. In some embodiments, the compartment pad 3 is made of silicone material. The frame 1 includes apertures 5 located around the perimeter. The apertures 5 are protruding outwards from the frame 1 and extends along the height of the frame 1. The apertures 5 are aligned mutually with apertures 5 of the connecting parts, for example, the compartment pad 3 and the compartment cover 4 for the purpose of securing the connecting parts to the frame 1. The apertures 5 of the frame 1 and the apertures 5 of the connecting parts are configured to receive connectors, for example, screws to secure them together. When in use and whenever the power source needs to be replaced, the connectors, the compartment cover 4, and the compartment pad 3 can be taken off in respective order, exposing the power source enclosure 2. The power source enclosure 2 is subsequently removed from the compartment 11 and replaced with a new power source enclosure 2 storing a new power source 21 of the same model. Finally, the compartment pad 3, the compartment cover 4, and the connectors can be put back in place. Because the boss of the compartment pad 3 and the groove 13 of the power source compartment 11 are secured by interference fit, the power source 2 can be securely fixed to the electronic lock. The interference fit between the compartment pad 3 and the frame 1 also provides the power source enclosure 2 with excellent waterproofing properties, preventing the power source from water ingress and avoiding the power source from short circuiting. The compartment cover 4 is securely fitted on the compartment pad 3 and the frame 1 which reduces the risk of damage to the power source 21. The aforesaid features thereby improve the reliability and extends the service life of the electronic lock.

Figure 4:
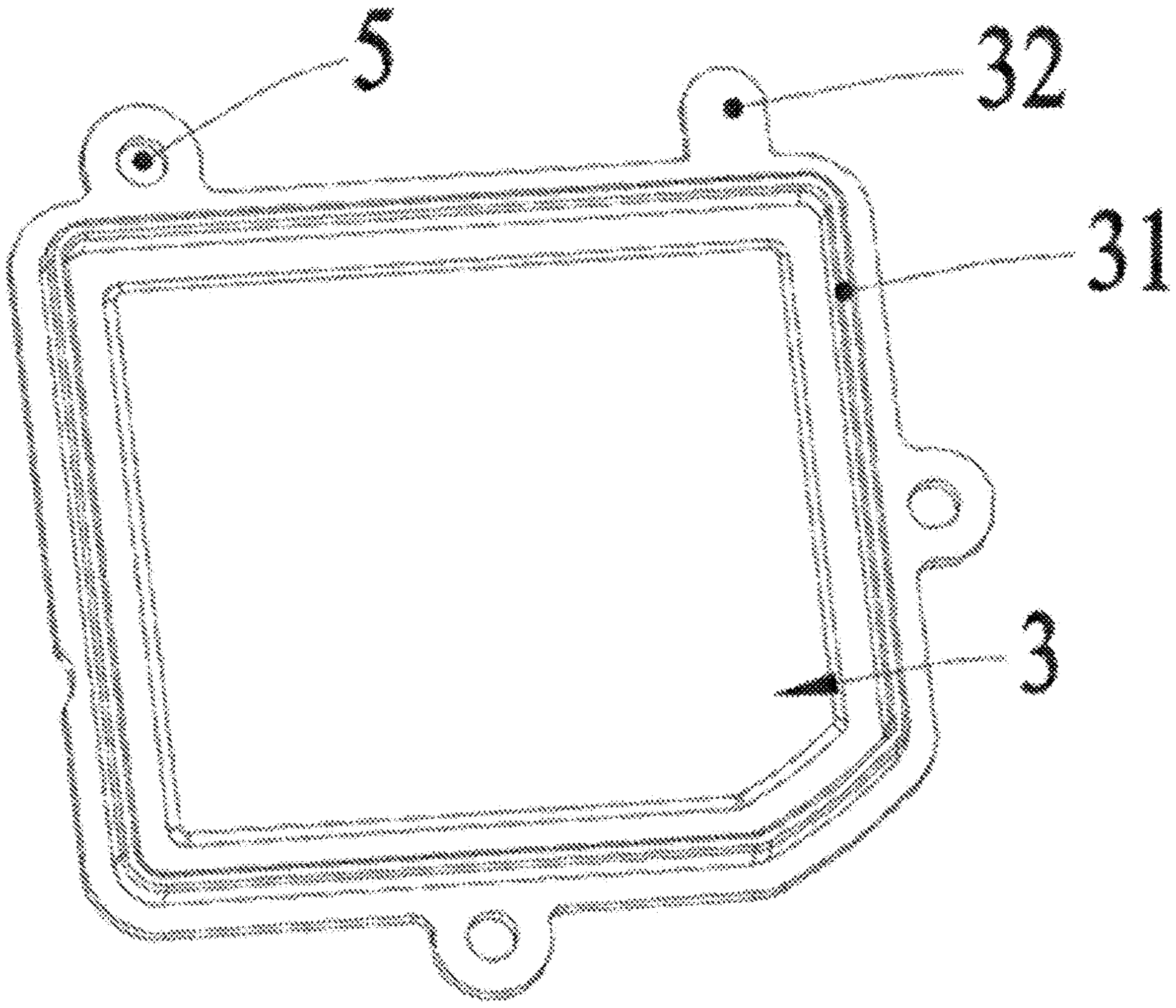
FIG. 4 is a perspective view of a compartment pad 3 according to various embodiments.

FIG. 4 is a perspective view of a compartment pad 3 according to various embodiments. In one embodiment, the compartment pad 3 has a bottom surface that includes the boss 31 extending around the perimeter of the compartment pad 3. The boss 31 fits snugly with the groove 13 of the frame 1 by interference fit. The compartment pad 3 is rectangular in shape and follows the shape of the frame 1. At certain sections of the compartment pad 3, one or more protrusions extend outwardly from the compartment pad 3. The protrusions include apertures 5 that are mutually aligned with the respective apertures of the frame 1 and the compartment cover 4. In one embodiment, the protrusion includes a protrusion 32 to allow the user to easily pull off the compartment pad 3 from the frame 1 when replacing the power source enclosure 2. In some embodiments, the compartment pad 3 is made of silicone material, the compartment cover 4 includes more than two apertures protruding outwards from the compartment cover 4. In another embodiment, the compartment pad 3 has an upper surface that includes sealing ribs (not shown) configured to improve the sealing between the compartment cover 4 and the compartment pad 3 when the compartment cover 4 is pressed against the compartment pad 3.

Figure 5:
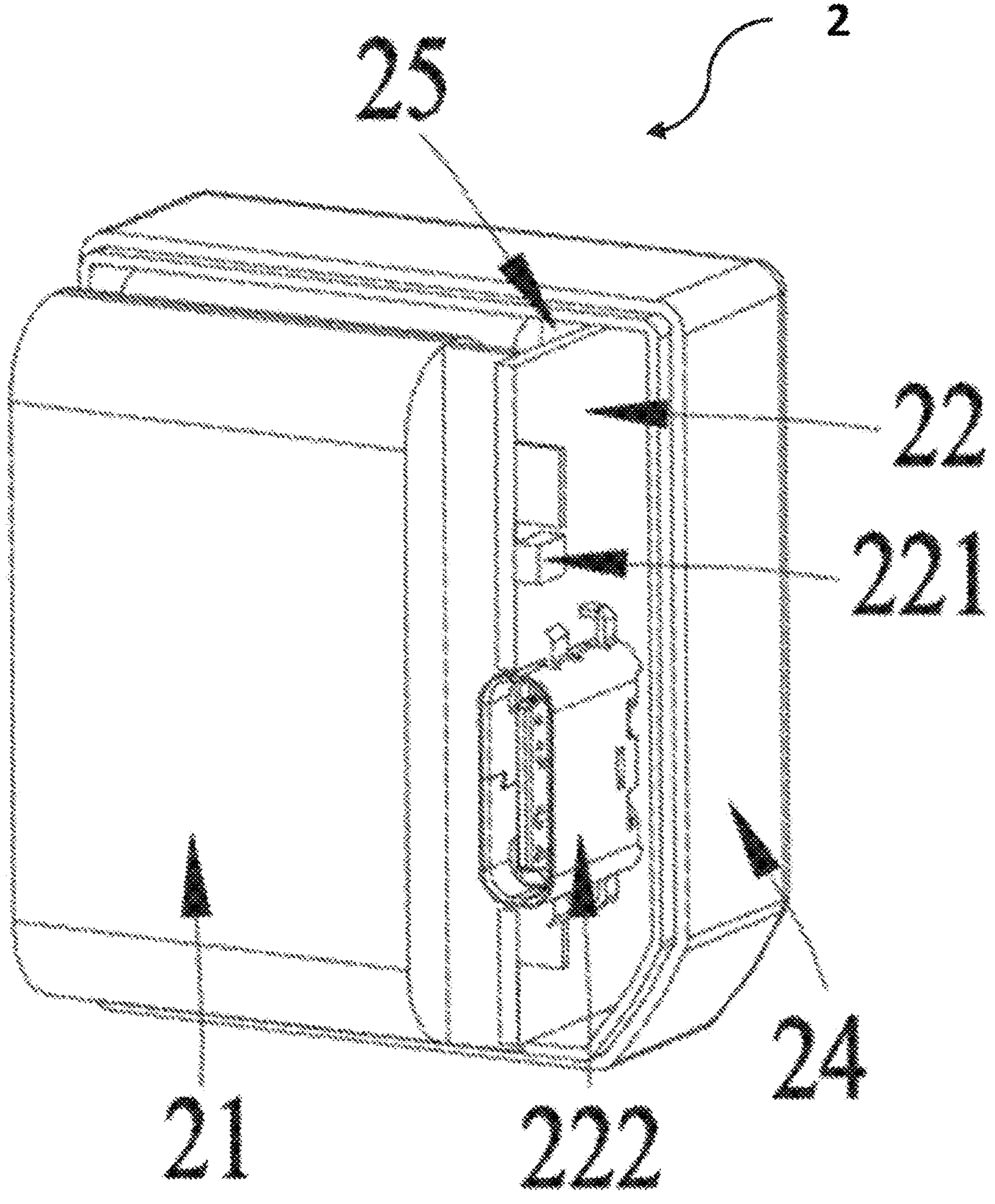
FIG. 5 is a perspective view of a power source enclosure according to various embodiments.
Figure 6:
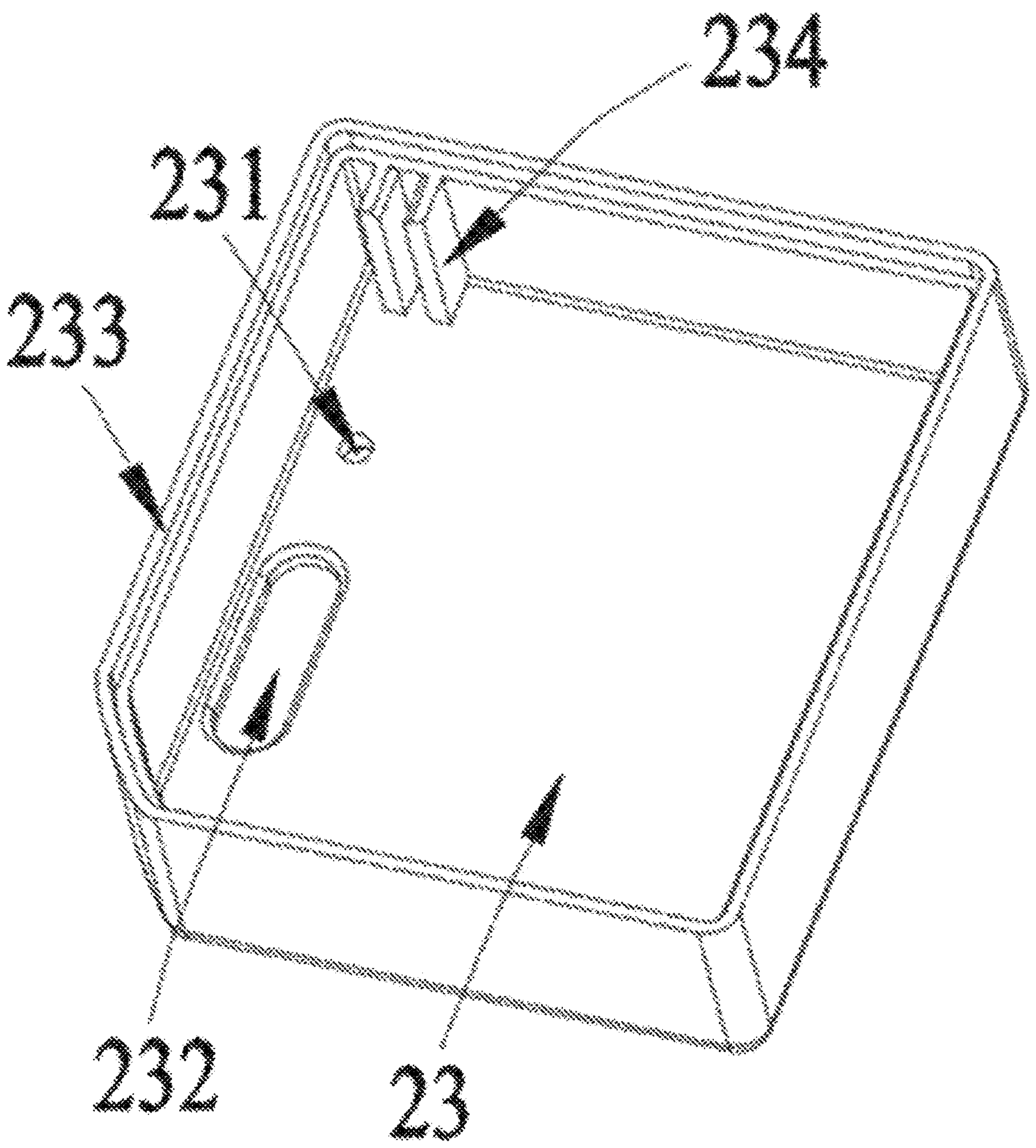
FIG. 6 is a perspective view of a first cover of the power source enclosure according to various embodiments.
Figure 7:
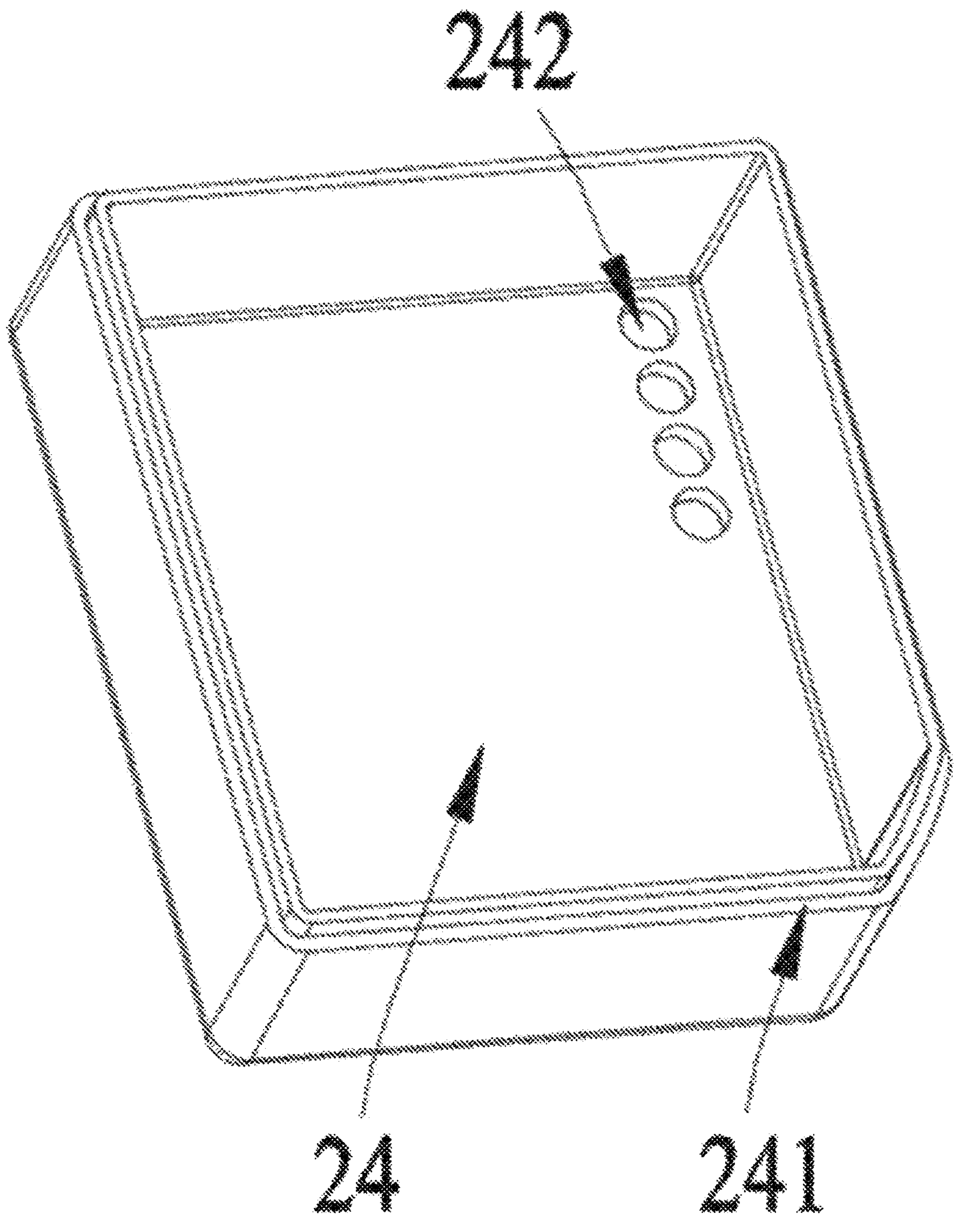
FIG. 7 is a perspective view of a second cover of the power source enclosure according to various embodiments.

FIG. 5 is a perspective view of a power source enclosure according to various embodiments. The power source enclosure 2 includes a first cover 23 and a second cover 24, as illustrated in FIG. 6 and FIG. 7 respectively, and stores the power source 21 and its internal components within the first cover 23 and the second cover 24. The power source enclosure includes a power source circuit board 22 that is in electrical communication with a power source 21.

Referring to FIG. 6, the first cover 23, shown without its internal components, has an indicator port 231 and a socket 232. The indicator port 231 corresponds with the power source circuit board 22 and has an indicator light 221 that allows the indicator light 221 to show through the indicator port 231 when in use. The socket 232 is configured to receive a charging socket 222 and allows a user to charge the power source 21 when a power supply cable is attached to the charging socket 222. In some embodiments, when the power source 21 is a rechargeable lithium power source, the power source enclosure 2 can be taken out of the power source assembly and plugged into a charging port or a USB or Type-C plug through the charging socket 222. It is envisaged that other types of suitable charging mechanisms can be used, for example, a power adapted. The indicator light 221 shows the charging status, such as in progress or completed. This way, the power source 21 can be reused and charged, which lowers the user cost and extends the power supply life. In some embodiments, the power source 21 may or may not be a rechargeable power source and the user simply replaces the power source enclosure 2 that stores the power source with a new power source enclosure 2 with a full power source life. In one embodiment, the first cover 23 and the second cover 24 are rectangular. The sides of the first cover 23 and the second cover 24 faces each other and includes a protrusion 233 and a notch 241 that lock together when fitted together. The protrusion 233 can be on the first cover 23 or the second cover 24 and the notch 241 can be on the first cover 23 or the second cover 24. The inner surface of the first cover 23 has two parallel rib plates 234, and the power source circuit board 22 is held vertically between them. This makes the first cover 23 and the second cover 24 more stable.

Referring to FIG. 7, the second cover 24 has a plurality of contact holes 242 for electrical communication of the locking mechanism of the electronic lock with the power source 21. The power source enclosure 2 has an electric contact plate 25 (shown in FIG. 5) that connects to the power source circuit board 22. The electric contact plate 25 has many electric contacts 251 that corresponds with the contact holes 242. The electronic lock 100 includes a controller with pins that fit with the contact holes 242. This way, the controller and the power source 21 can be connected well, and the power source 21 can power the controller dependably.

Figure 8:
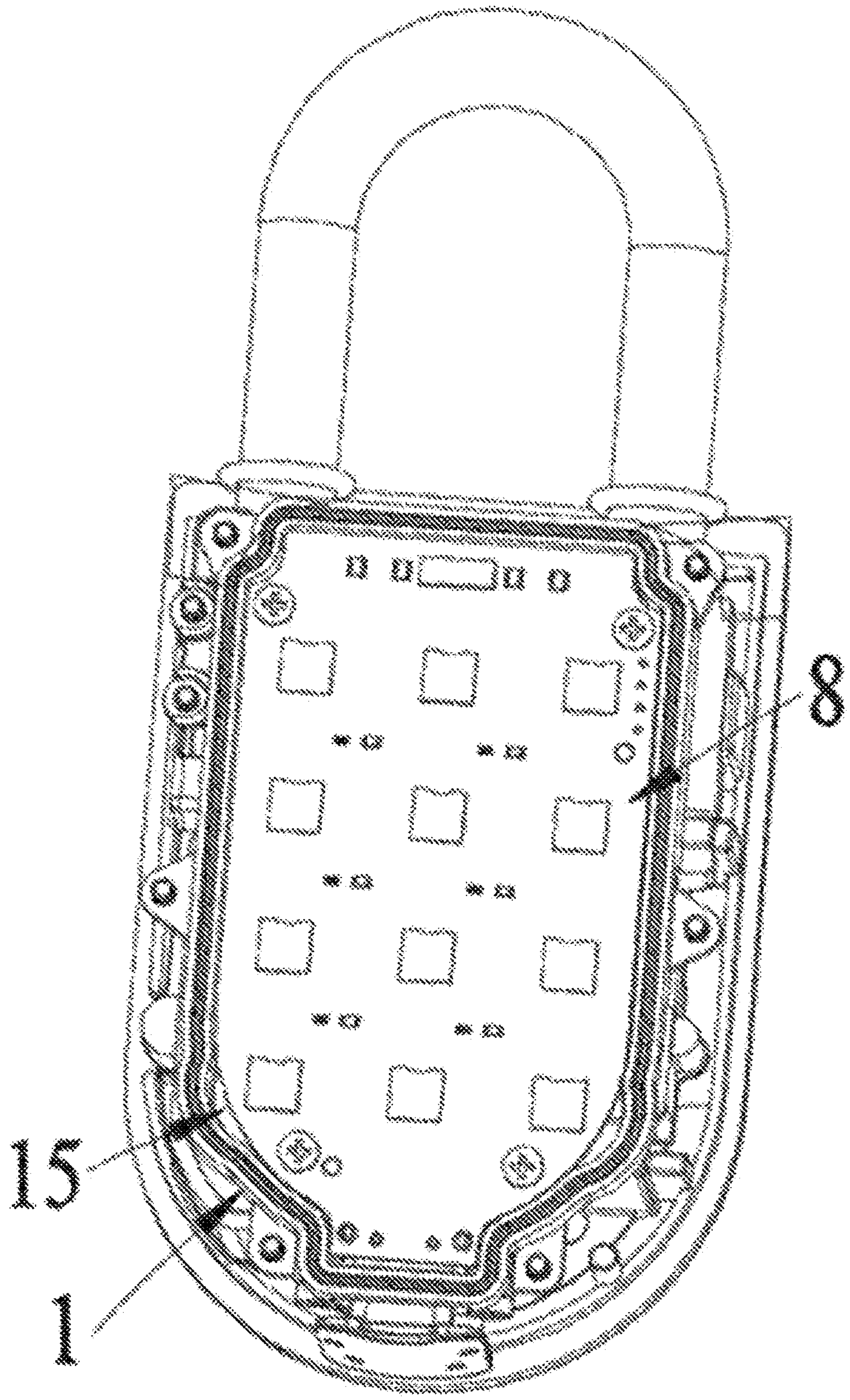
FIG. 8 illustrates the internal components of the front side of the electronic according to various embodiments.
Figure 9:
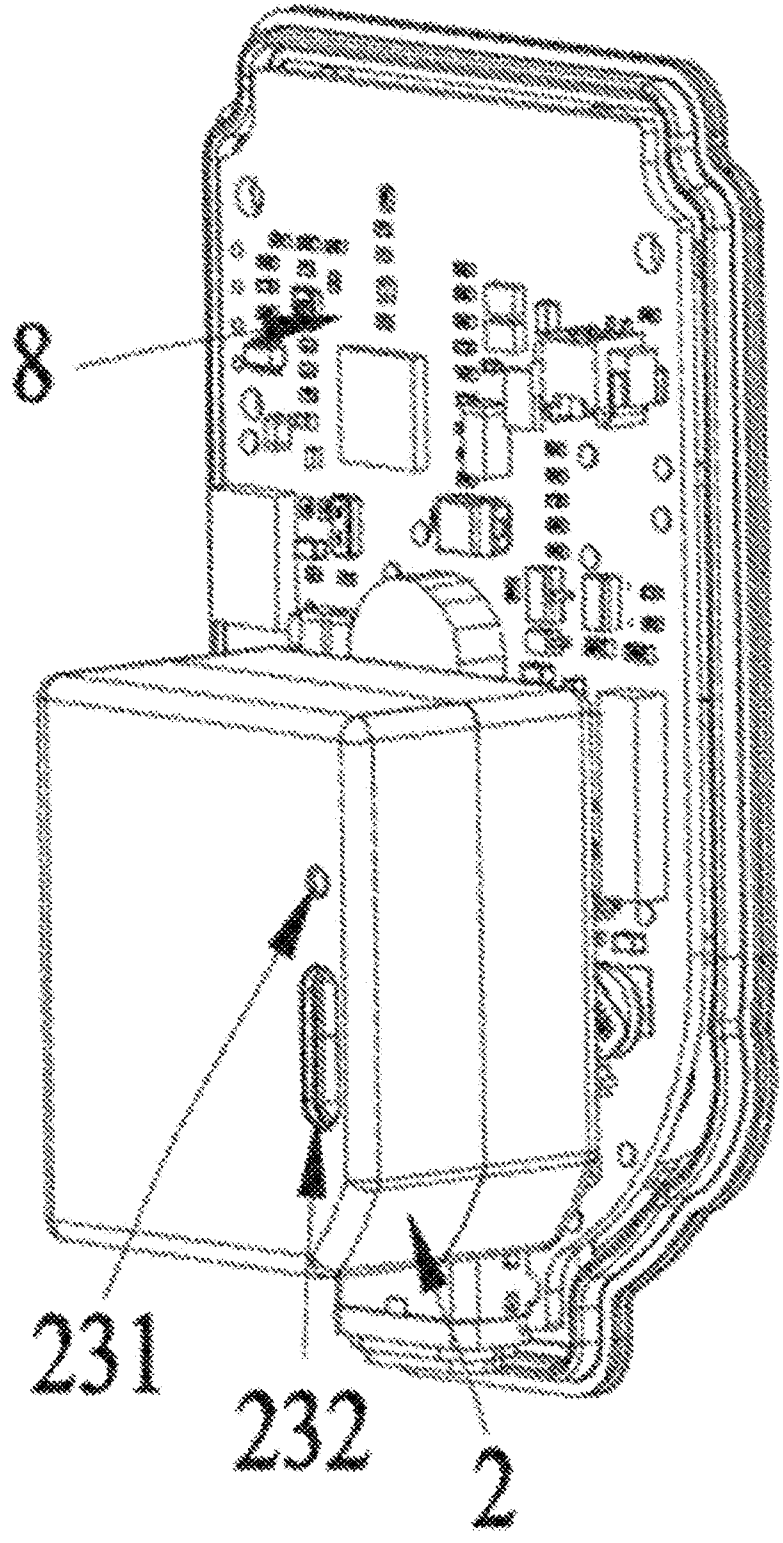
FIG. 9 illustrates the internal components of the rear side of the electronic lock according to various embodiments.

FIGS. 8 and 9 show the internal components of the electronic lock according to various embodiments. Referring to FIG. 8, the electronic lock 100 has an input interface. The input interface includes an input interface frame 15 that includes a recess for receiving the mechanical keypad display. The mechanical keypad display is easy to install and waterproof, and also reduces the distance between the mechanical keypad display and the power source enclosure 2. The input interface frame 15 has a plurality of holes 16 (shown in FIG. 11) that connect the power source enclosure 2 with the mechanical keypad display.

Figure 10:
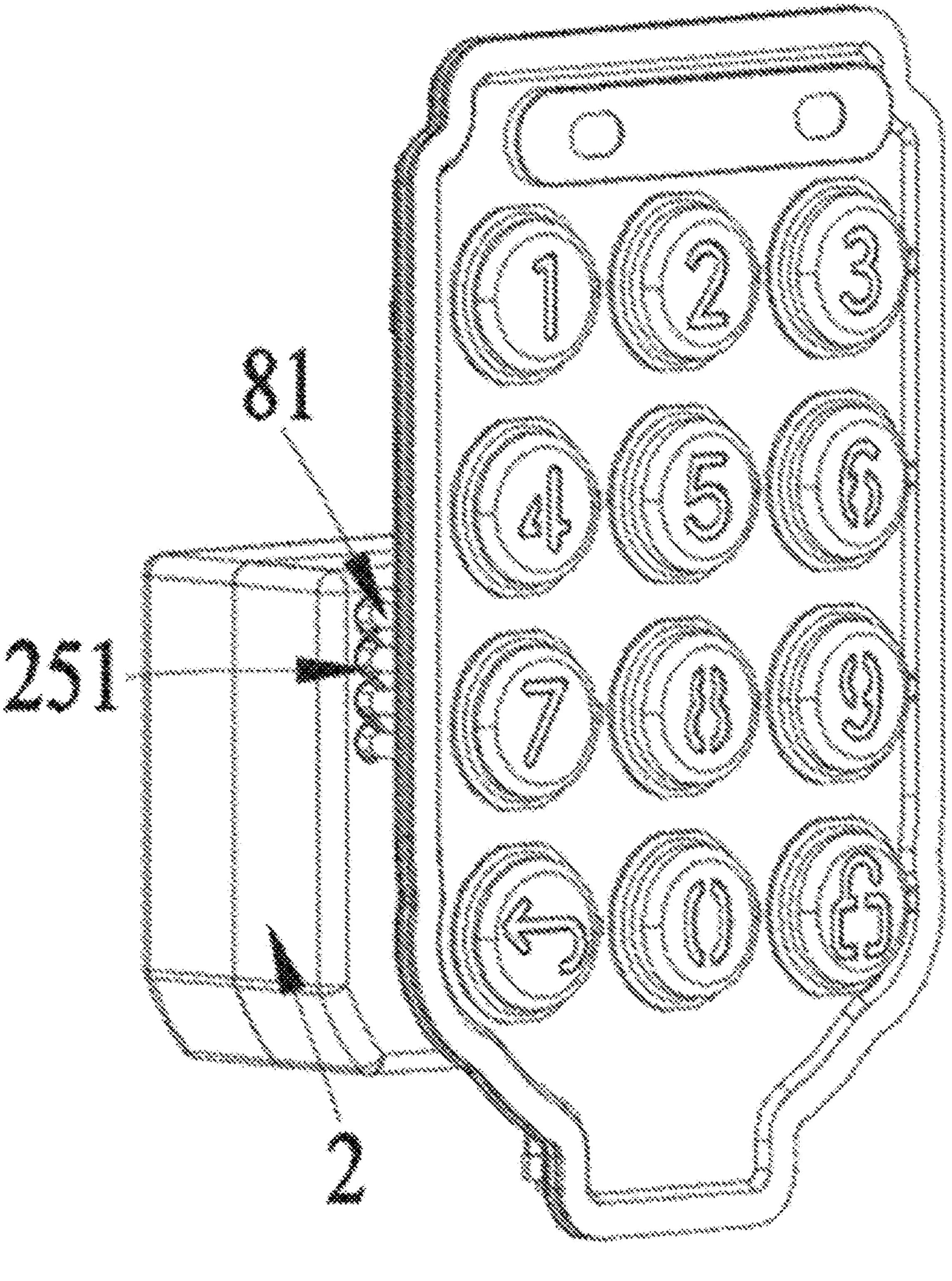
FIG. 10 illustrates the connection between the power source enclosure and the input interface according to various embodiments.
Figure 11:
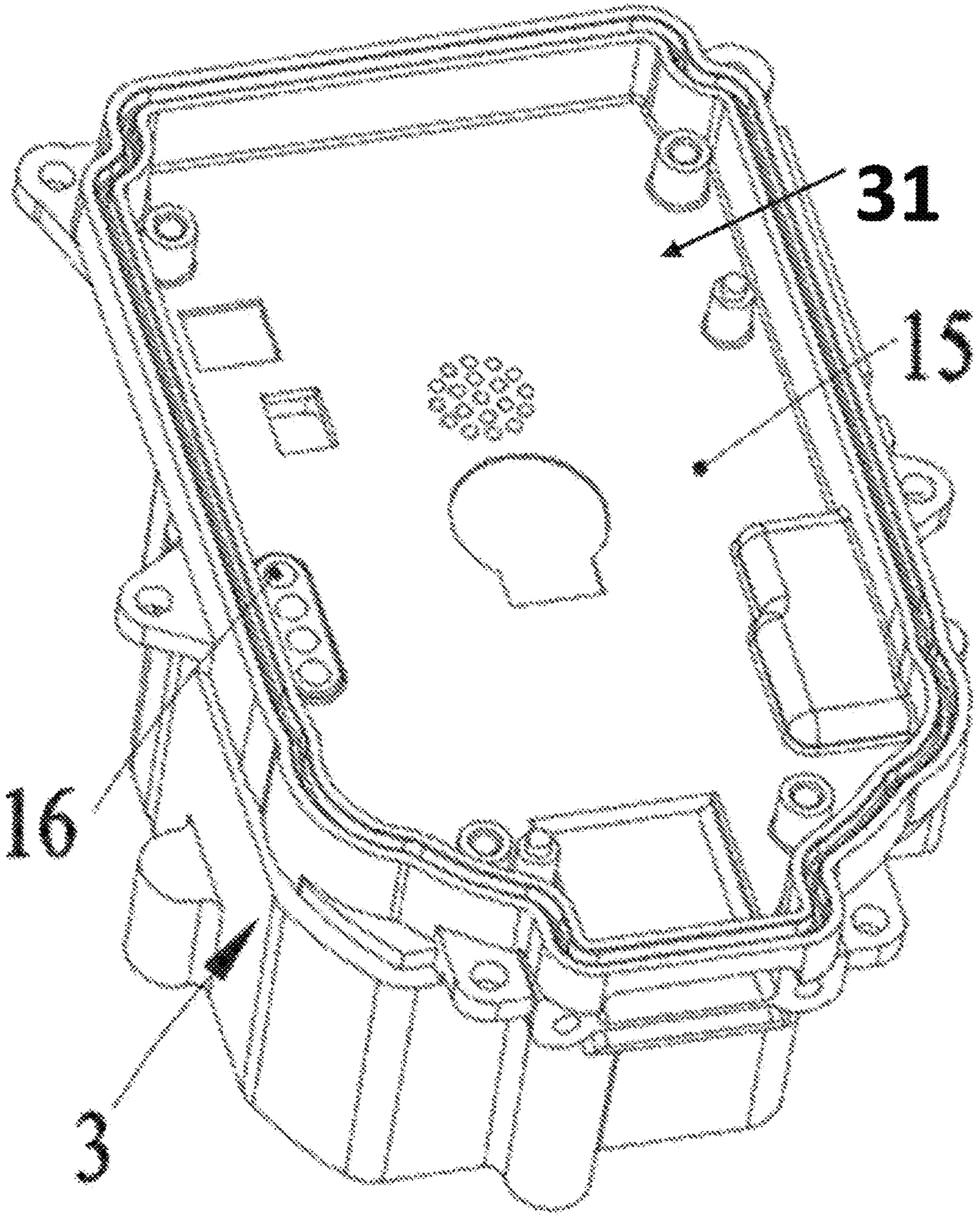
FIG. 11 illustrates a perspective view of the connection between the power source enclosure and the input interface frame according to various embodiments.

FIGS. 10 and 11 illustrates the connection between the power source enclosure and the input interface according to various embodiments. Referring to FIG. 10, the power source enclosure 2 includes conductive pins 81 that go through the plurality of holes 16 and connect with the electric contacts 251 of the input interface. The holes 16 help the pins 81 go through smoothly and ensure a good electric connection between the input interface and the power source enclosure 2.

Figure 12:
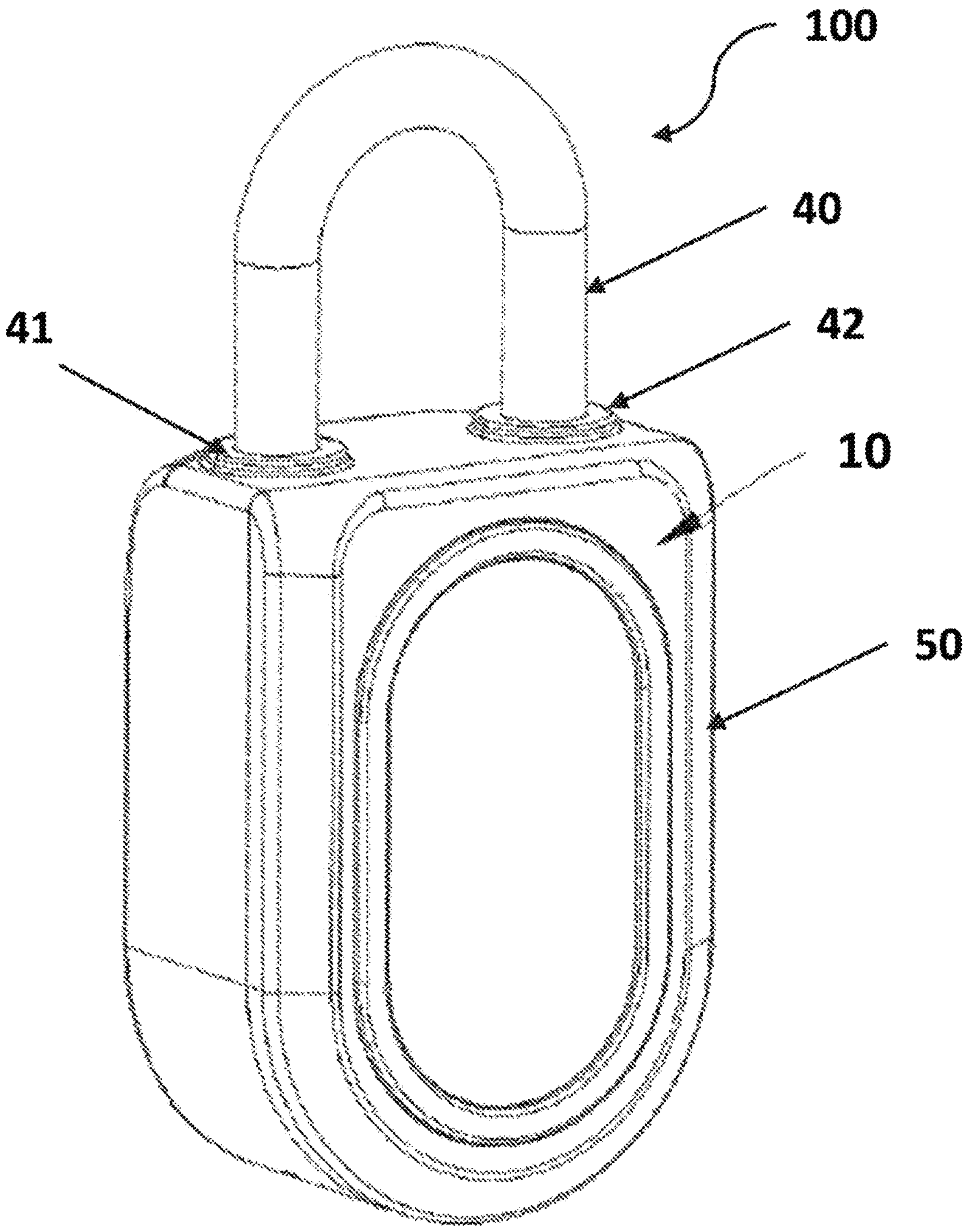
FIG. 12 illustrates a perspective view of a rear side of an electronic lock according to various embodiments.

FIG. 12 illustrates a perspective view of a rear side of an electronic lock according to various embodiments. As motioned previously, the electronic lock 100, for example an electronic padlock, includes a lock body 50 and a shackle 40. The lock body 50 includes a front cover 9 and a rear cover 10 that is removably detachable from the front cover 9. The shackle 40 is designed to latch and unlatch relative to the lock body 50, enabling locking and unlocking.

Figure 13:
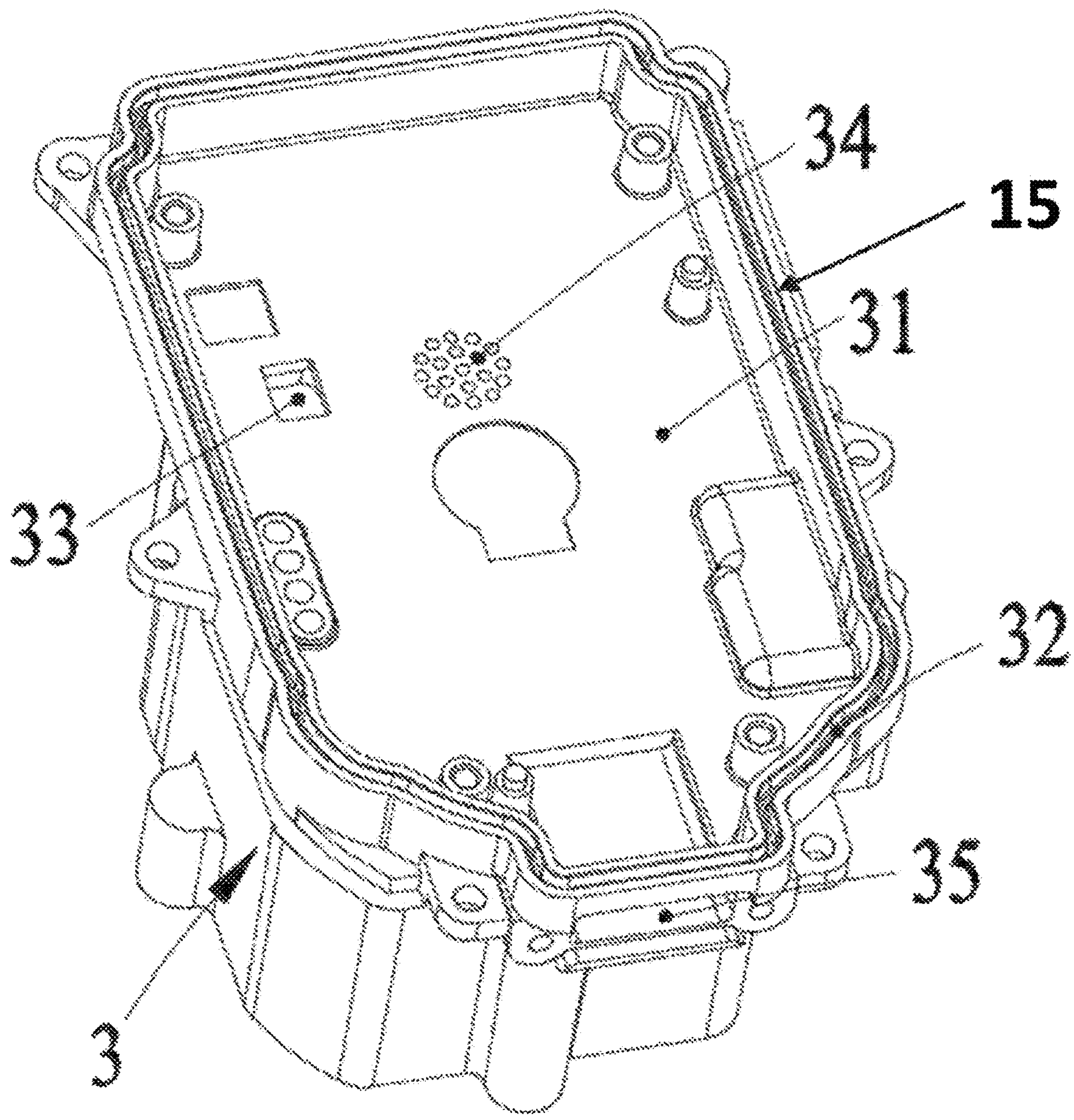
FIG. 13 illustrates a perspective view of the internal components of an electronic lock without its front cover and rear cover according to various embodiments.

FIG. 13 illustrates a perspective view of the internal components of an electronic lock without its front cover and rear cover according to various embodiments. A cavity resides within the front cover 9 and the rear cover 10. The cavity includes a central frame 3 and an input interface frame 15. The input interface frame 15 includes a recess 31. The input interface frame 15 is configured to receive a keypad plate that includes alphanumeric symbols 42 for users to depress. The input interface frame 15 has an upper surface that surrounds the frame and include a channel surrounding the input interface frame 15. In one embodiment, the input interface frame 15 includes a PCB board (not shown) in the recess 31. The recess 31 includes a cable opening 33 and a speaker opening 34 on its surface. The speaker on the PCB board faces the speaker opening 34, which has a waterproof membrane over it (not shown). The cable opening 33 is configured for receiving a cable from the power source enclosure 2 and is sealed with waterproof glue around the cable. The cable carries current and signals to the drive motor, and it connects the PCB board and the drive motor. In this way, the electronic lock ensures good electrical and sound functions, and prevents water from entering through the cable opening 33 or the speaker opening 34, improving its water resistance.

Figure 14:
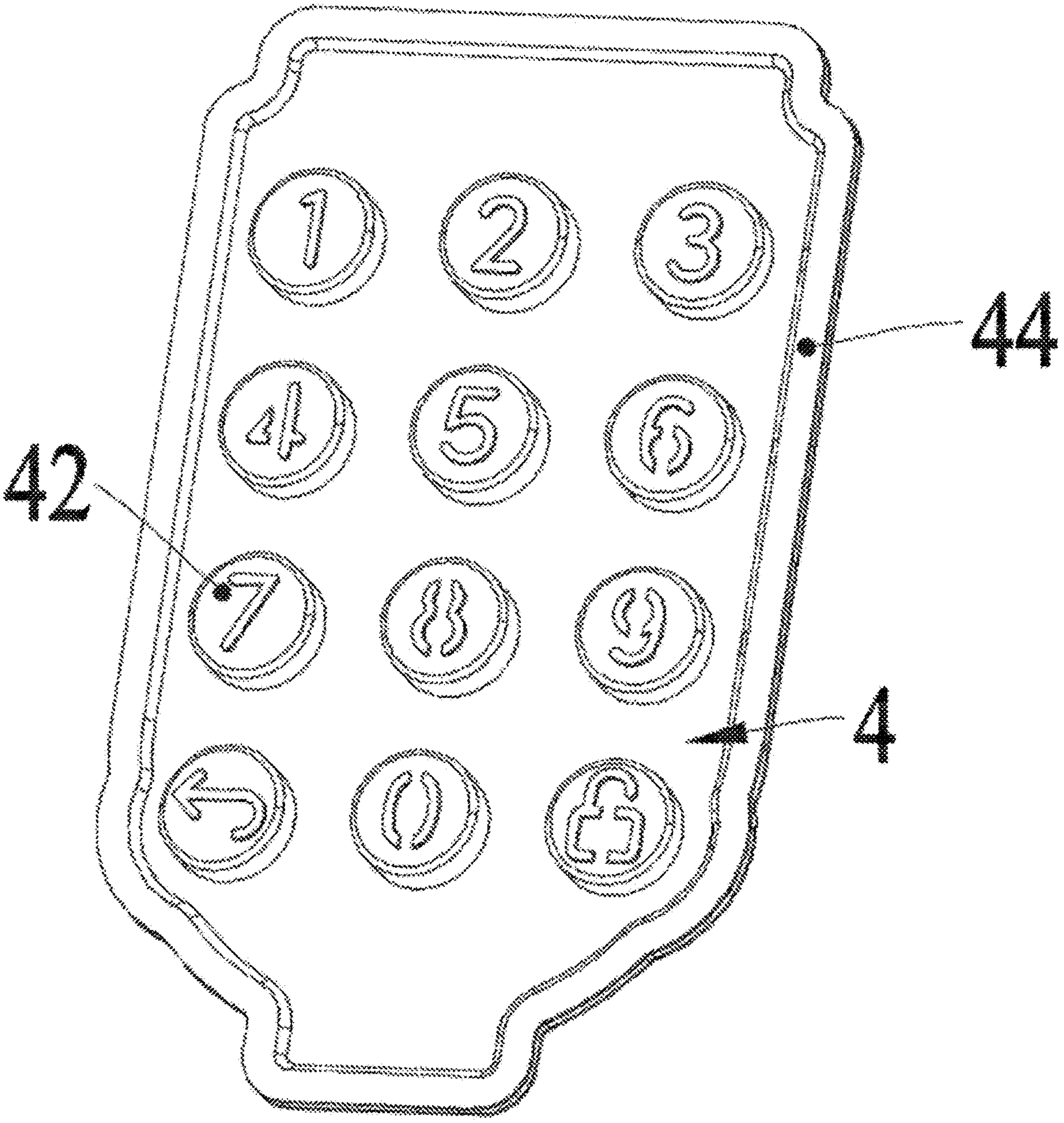
FIG. 14 illustrates a perspective view of a keypad plate according to various embodiments.

FIG. 14 illustrates a perspective view of a keypad plate according to various embodiments. The keypad plate 4 includes alphanumeric symbols 42 for users to depress. The keypad plate 4 is made of a flexible material like rubber or silicone and is configured to be received by the input interface controller (not shown, explained later). The keypad plate 4 fits the shape of the recess 31 of the input interface frame 15.

Figure 15:
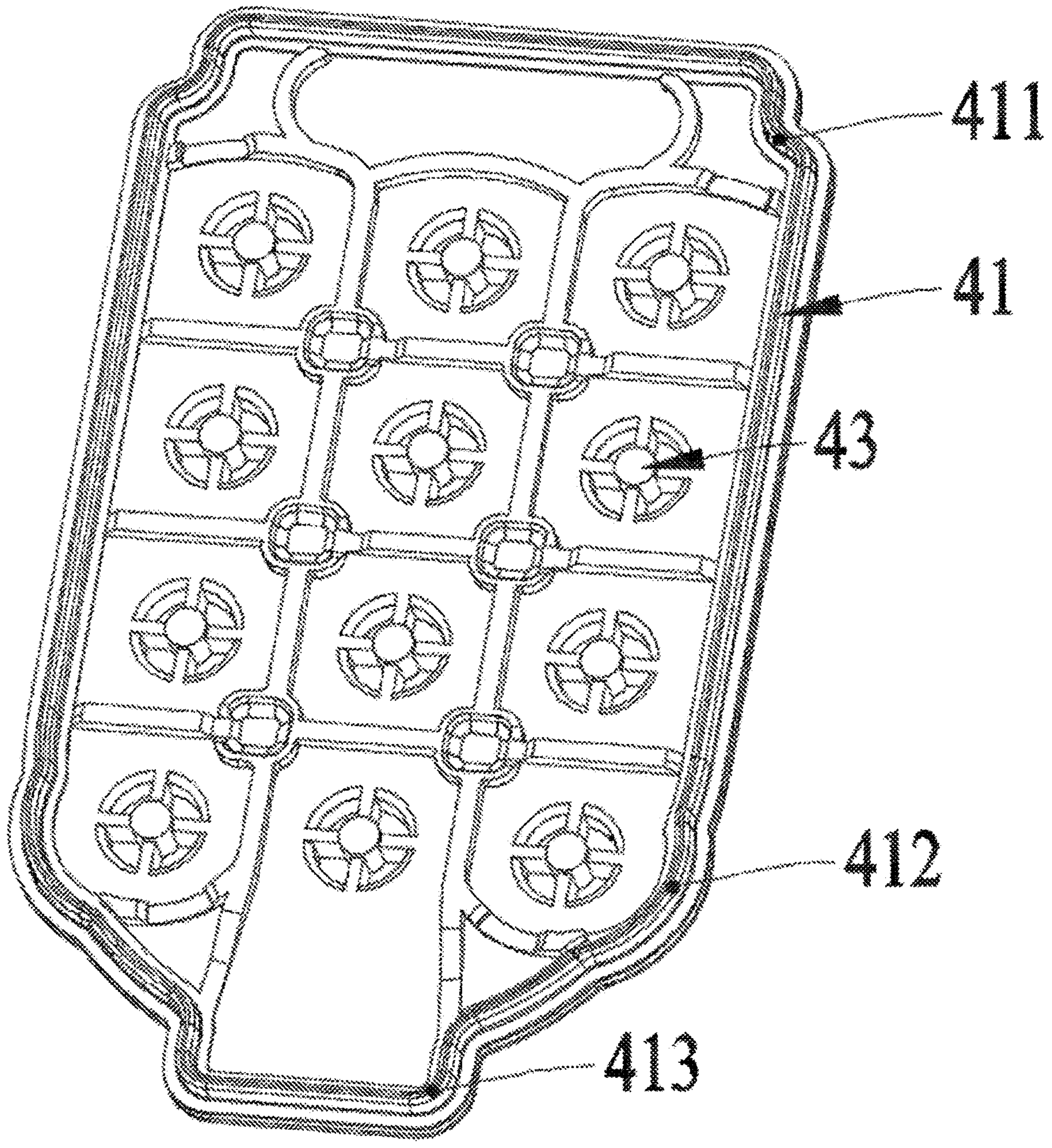
FIG. 15 illustrates a perspective view of a bottom surface of the keypad plate according to various embodiments.

FIG. 15 illustrates a perspective view of a bottom surface of the keypad plate according to various embodiments. The bottom surface of the keypad plate 4 includes a first protrusion 41 that matches the shape of the channel 32 of the input interface frame 15. The protrusion 41 is configured to fit tightly into the channel 32 to ensure that the keypad plate 4 and the input interface frame 15 is sealed. In some embodiments, the protrusion 41 has a lip shape to make the fit stronger. This way, the protrusion 41 of the key plate 4 and the channel 32 of the central frame 3 seals the cavity within the front cover and the rear cover and prevents ingress of water. The cavity is also configured to store the power source, controller, drive motor, and other electronic parts directly or indirectly. This means the cavity protects the electronic parts from water and prevents short circuits. This helps the electronic lock last longer, work better, and be used in different places. In some embodiments, the bottom surface of the keypad plate 4 includes a plurality of grooves surrounding the perimeter of the alphanumeric symbols or along the edge of the keypad plate 4. For example, the plurality of grooves include a pair of wave grooves 411, a pair of arc grooves 412, and a moment groove 413. Each of the aforesaid grooves has a different shape resulting in different elastic deformation when fitted with the channel 32 of the input interface frame 15, leading to a firmer fit with the channel 32 and improved waterproofing property.

Referring to FIGS. 14 and 15, the keypad plate 4 has two opposing surfaces: the top plate surface and the bottom plate surface. The bottom plate surface has a protrusion 41, and the top plate surface has a plurality of key bosses 42. Each key boss 42 includes a column 43 below its top surface that is visible from the bottom plate surface. When the columns 43 are not pressed, their free ends are lower than the free ends of the protrusion 41 in the direction of the bottom plate surface. This gives each column 43 some space to move perpendicularly to the bottom plate surface. This makes the lock waterproof and comfortable to use when the user presses the key bosses 42.

Figure 16:
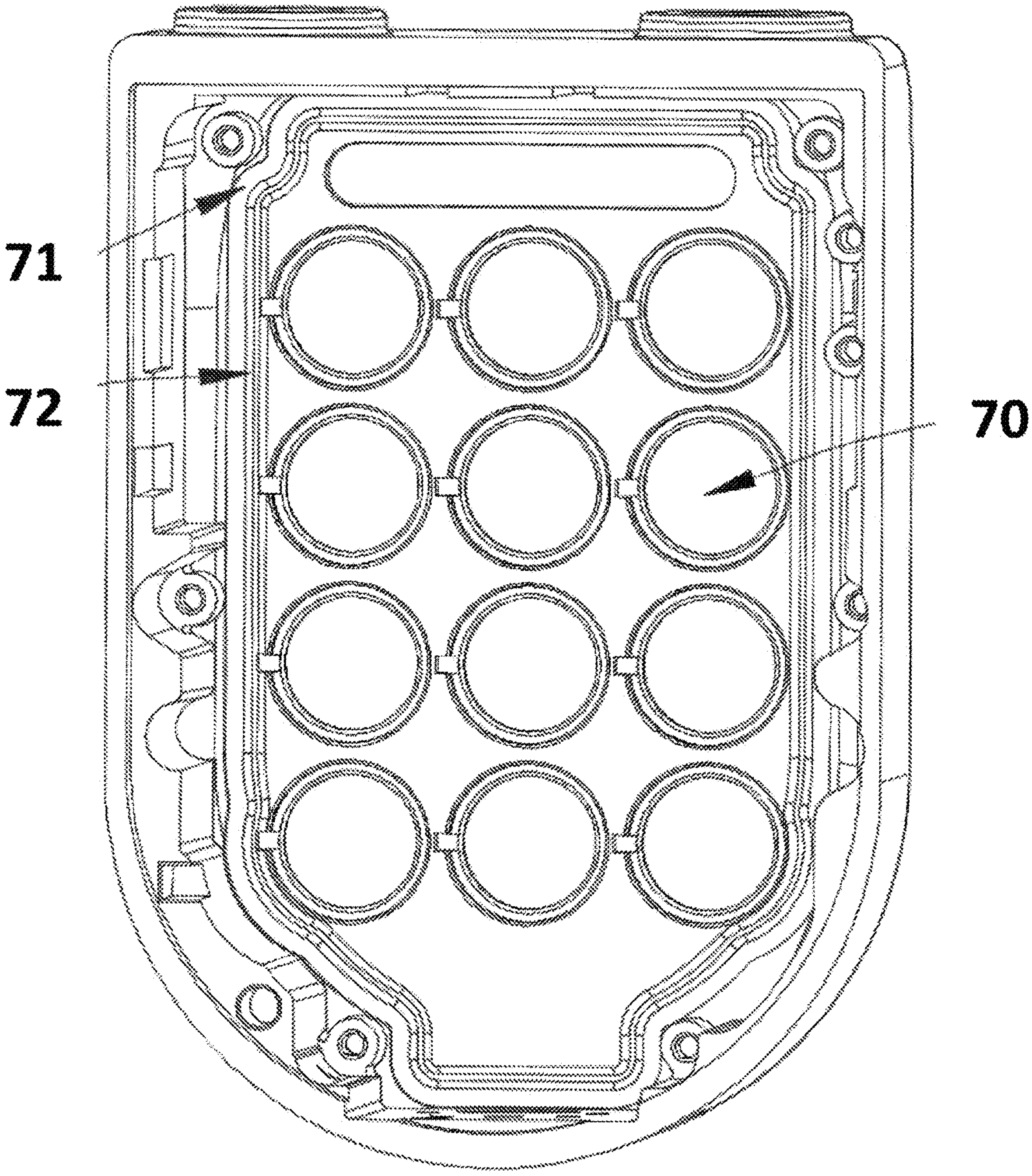
FIG. 16 illustrates a perspective view of the key plate according to various embodiments.

FIG. 16 illustrates a perspective view of the key plate according to various embodiments. In one embodiment, the key plate 4 has many openings 70 that fit the key bosses 42. Each opening 70 also has a key cover with different numbers or symbols on the key bosses 42. The key cover makes the user feel the buttons better and press them harder. The key cover includes a plurality of notches 71 and a plurality of ribs 72 inside the notches 71. The top plate surface of the key plate 4 has a raised platform 44 surrounding the alphanumeric keys that squeeze into the notches 12 and touch the waterproof ribs 13. By putting waterproof glue (not shown)

between the raised platforms 44 and the notches 12, the lock becomes more waterproof and stops water from getting inside the key plate 4.

Figure 17:
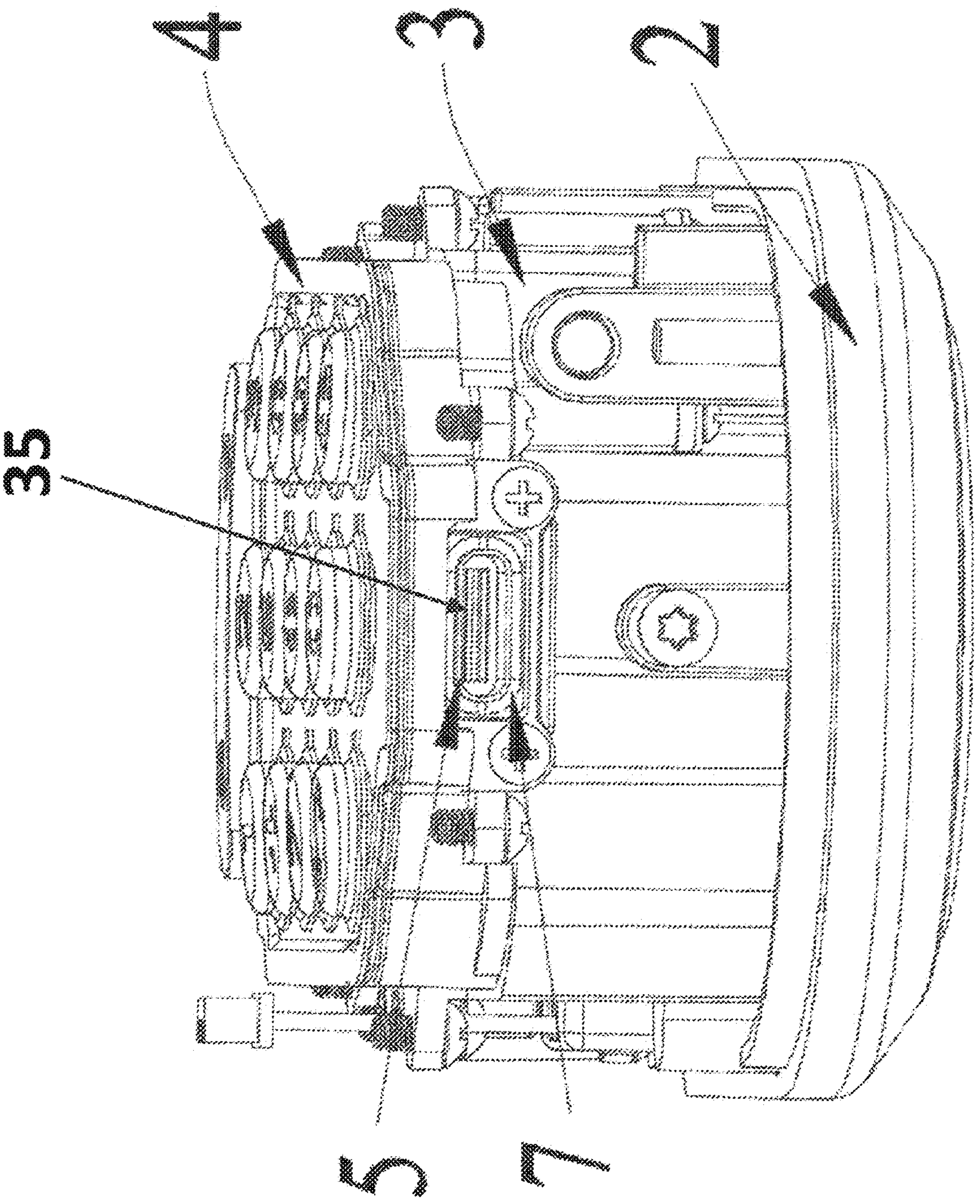
FIG. 17 illustrates a side view of an electronic lock without its front cover according to various embodiments.
Figure 18:
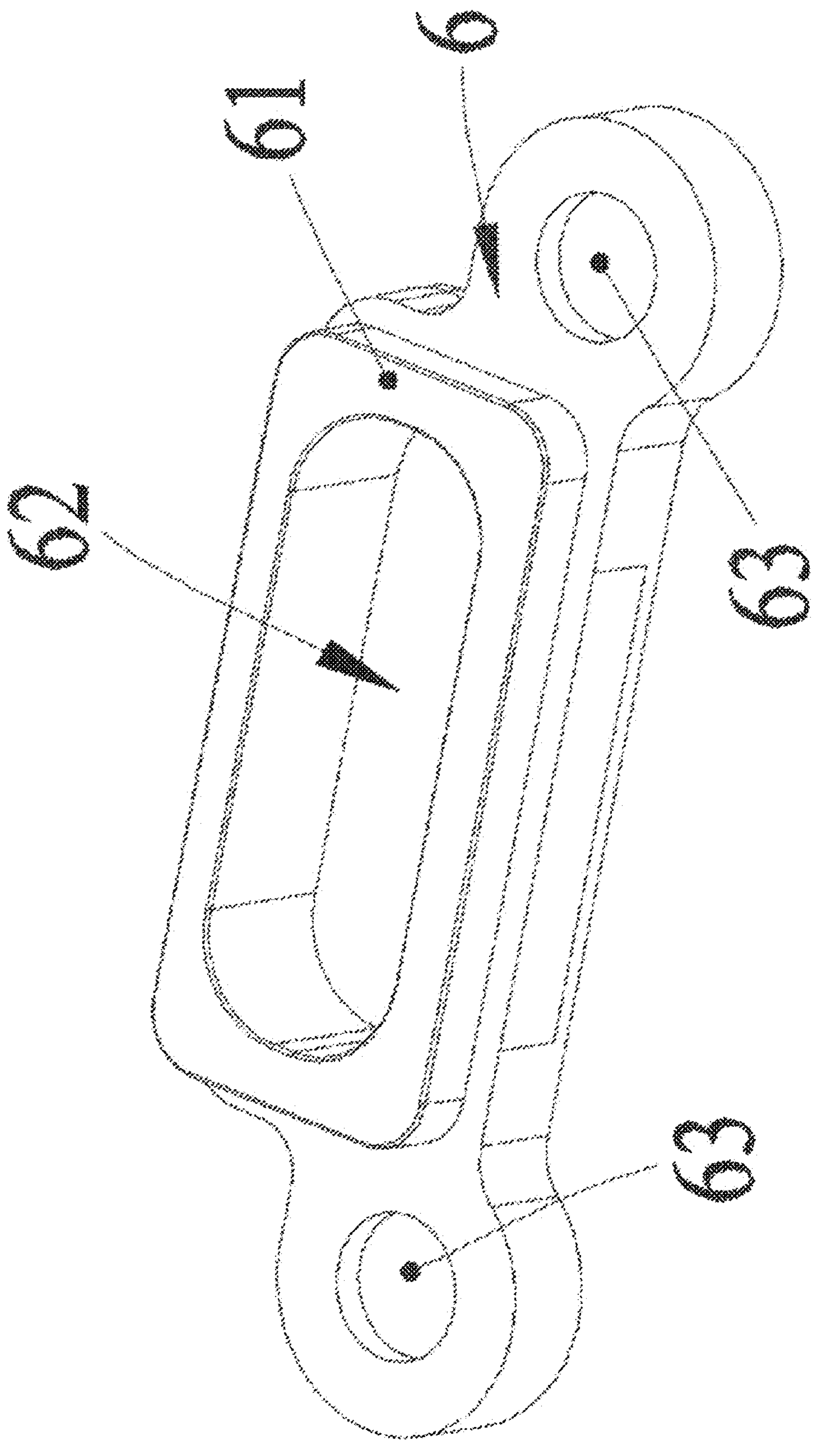
FIG. 18 shows a waterproof plate according to various embodiments.

FIG. 17 illustrates a side view of an electronic lock without its front cover according to various embodiments. FIG. 18 shows a waterproof plate according to various embodiments. Referring to the aforesaid figures, the central frame 3 includes a charging port 35, which includes a USB Type-C interface 5 on the PCB board. A waterproof plate 6 is configured for mounting to the bottom end of the central frame 3. The waterproof plate 6 includes two openings 63, each configured to receive a screw for mounting to the central frame 3. The waterproof plate 6 has a bump 61 that touches the edge of the Type-C interface 5, and a hole 62 corresponding to the charging port 35 and the Type-C interface 5. The gap between the bump 61 and the Type-C interface 5 is filled with waterproof glue, which can be injected by a syringe-like device. An elastic ring 7 is fixed on the central frame 3, and the bump 61 presses against it. In this way, the waterproof plate 6 improves the water resistance of the Type-C interface 5, which is usually vulnerable to water.

Figure 19:
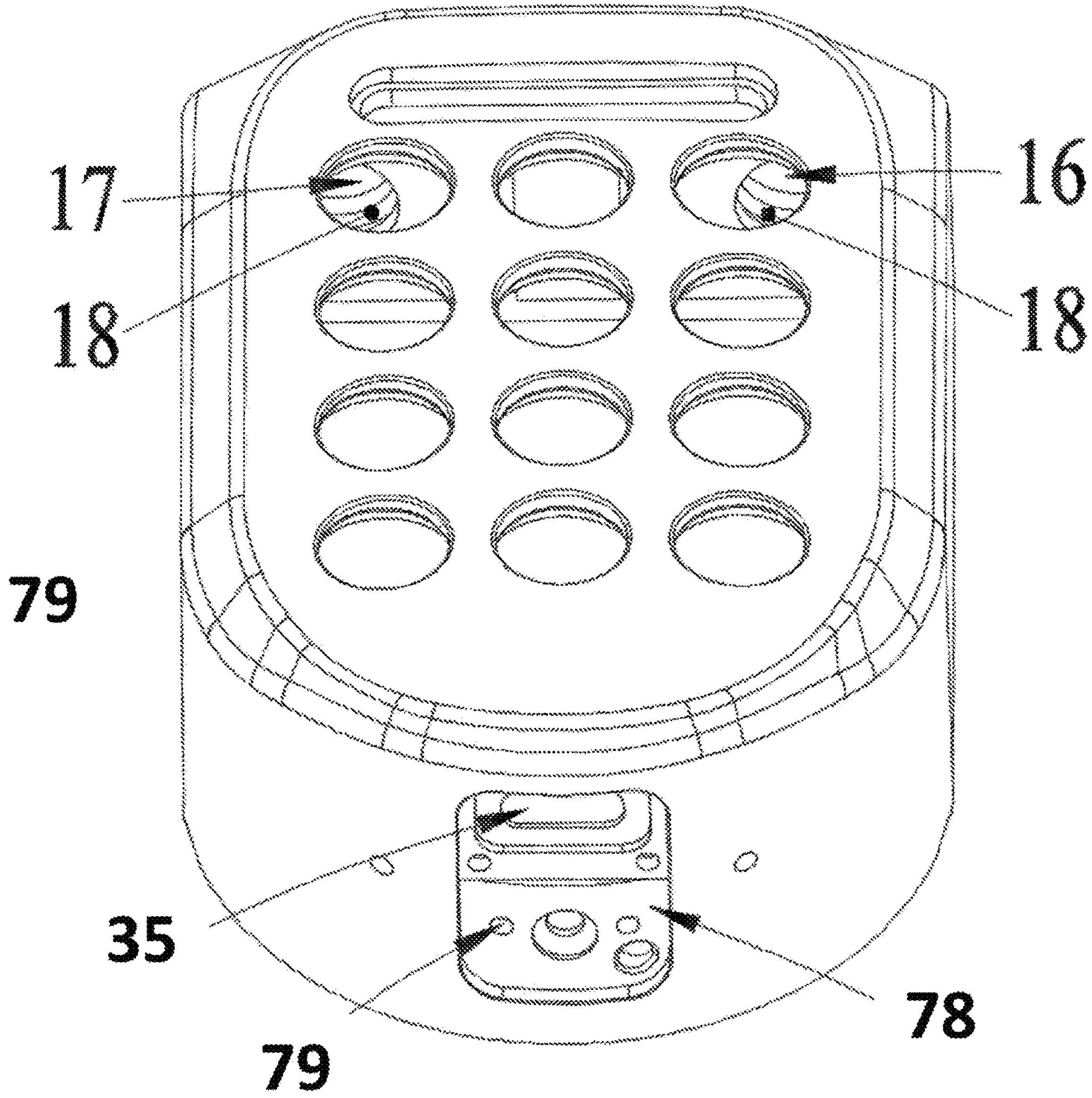
FIG. 19 illustrates a side view of the electronic lock according to various embodiments.
Figure 20:
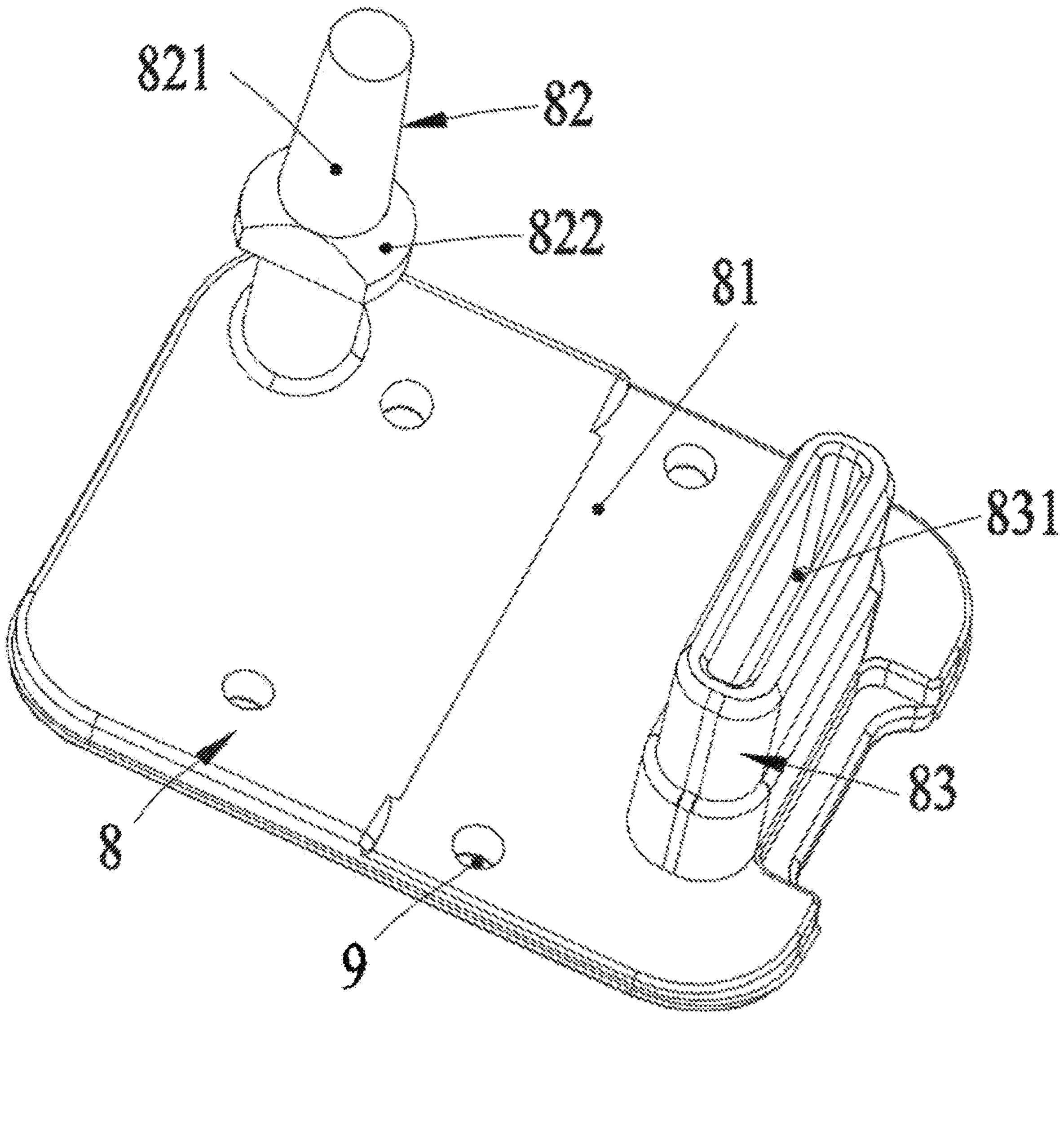
FIG. 20 illustrates a sealing plug for the electronic lock according to various embodiments.

FIG. 19 illustrates a side view of the electronic lock according to various embodiments. FIG. 20 illustrates a sealing plug for the electronic lock according to various embodiments. In one embodiment, a sealing plug 8 is configured for mounting onto the Type-C interface 5. The sealing plug 8 is made of silicone, and it has a cover 81 with a movable rod 82 and a plug 83 on the side facing the Type-C interface 5. The movable rod 82 has a rod 821 and two bumps 822 that prevents the plug 8 from falling off the electronic lock. The rod 821 goes into a socket 78 at the bottom end of the front cover 9, and the bumps 822 squeeze through the socket 78, keeping the plug 8 attached to the front cover 9. The plug 83 has a hole 831 that matches the Type-C interface 5, and the cover 81 fits into a recess portion on the front cover 9. When the Type-C interface 5 is not in use, the cover 81 of the plug 8 covers the recess portion, and the plug 83 blocks the Type-C interface 5, stopping water from entering the electronic lock. There are also several pairs of holes 79 on the recess portion and the cover 81, which let any water that gets inside the front cover 9 drain out by gravity, preventing it from building up.

Figure 21:
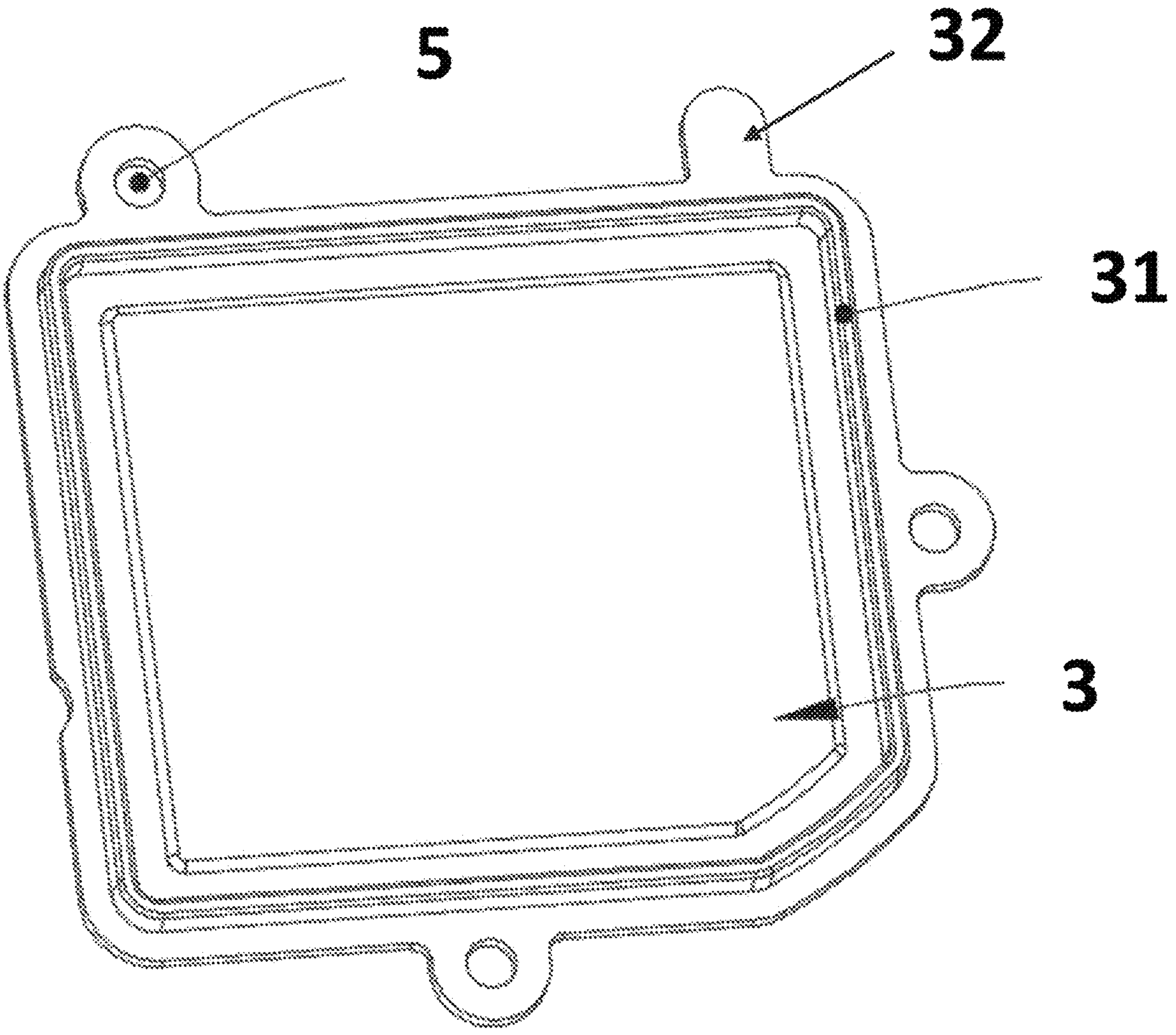
FIG. 21 is a perspective view of a compartment pad 3 according to various embodiments.
Figure 22:
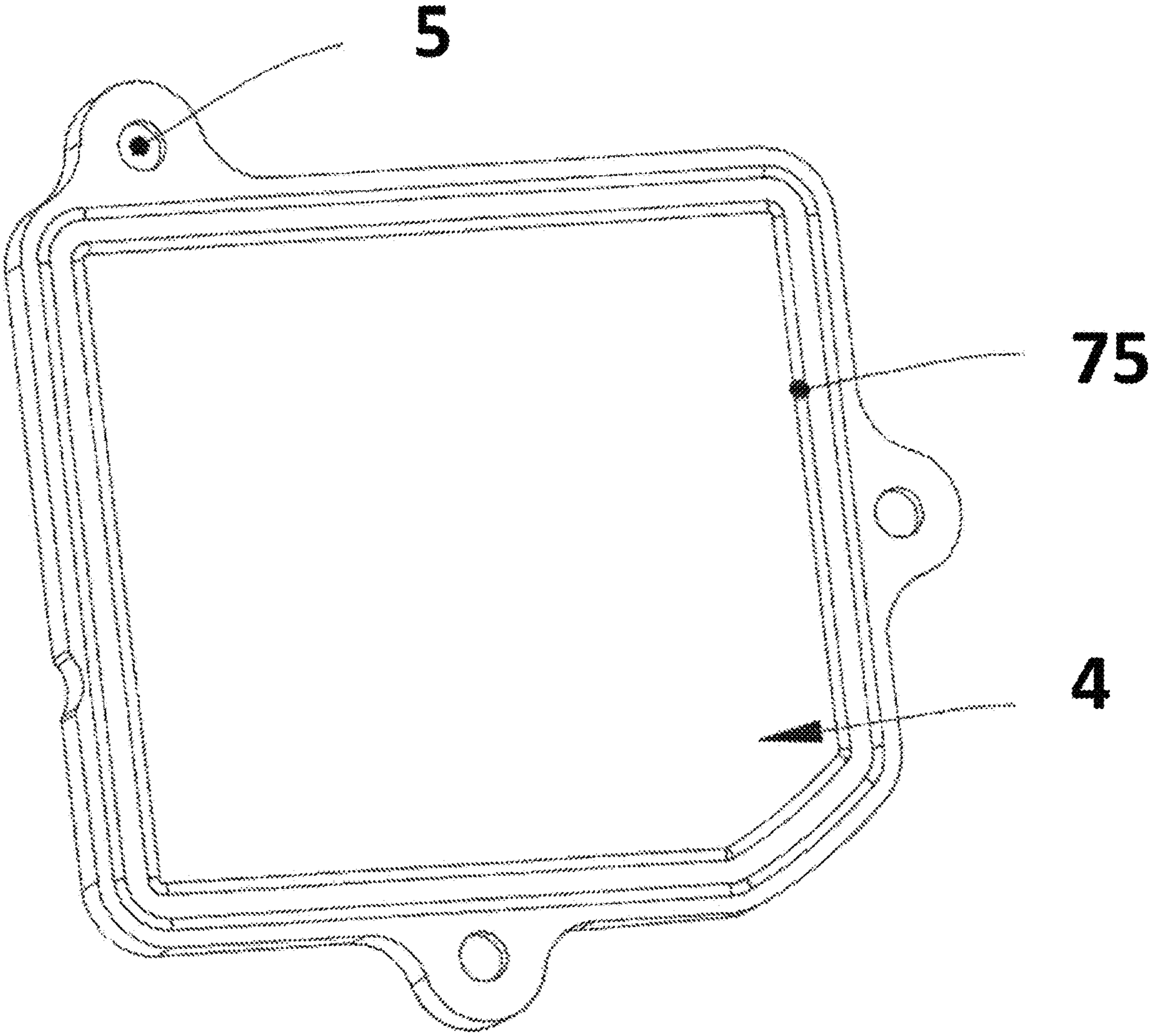
FIG. 22 is a perspective view of a compartment cover 4 according to various embodiment.

FIG. 21 is a perspective view of a compartment pad 3 according to various embodiments. FIG. 22 is a perspective view of a compartment cover 4 according to various embodiments. As mentioned previously and with reference to FIG. 21, in one embodiment, the compartment pad 3 has a bottom surface that includes the boss 31 extending around the perimeter of the compartment pad 3. The boss 31 fits snugly with the groove 13 of the frame 1 by interference fit. The compartment pad 3 is rectangular in shape and follows the shape of the frame 1. At certain sections of the compartment pad 3, one or more protrusions extend outwardly from the compartment pad 3. The protrusions include apertures 5 that are mutually aligned with the respective apertures of the frame 1 and the compartment cover 4. In one embodiment, the protrusion includes a protrusion 32 to allow the user to easily pull off the compartment pad 3 from the frame 1 when replacing the power source enclosure 2. In some embodiments, the compartment pad 3 is made of silicone material.

Referring to FIG. 22, the compartment cover 4 is configured for mounting on top of the compartment pad 3. The compartment cover 4 includes more than two apertures protruding outwards from the compartment cover 4. In one embodiment, the compartment pad 3 has an upper surface that includes sealing ribs (not shown) configured to improve the sealing between the compartment cover 4 and the compartment pad 3 when the compartment cover 4 is pressed against the compartment pad 3. In some embodiments, the compartment cover 4 is made of plastic. This ensures the power source works well and lowers the chance of the electronic lock breaking because of a short circuit in the power source. In one embodiment, the compartment cover 4 has two or more elastic ribs 75. When the compartment cover 4 is attached to the compartment pad 3, the two rings of elastic ribs 75 squeeze and changes shape to make the connection between the compartment pad 3 and the copartment cover 4 tighter and more stable. Also, the mutually aligned apertures 5 on the walls 12 of the frame 1, compartment pad 3 and compartment cover 4 forms a sharp triangle making the compartment cover 4 press evenly on the elastic ribs 75. This ensures the power source works well and lowers the chance of the electronic lock breaking because of a short circuit in the power source.

Figure 23:
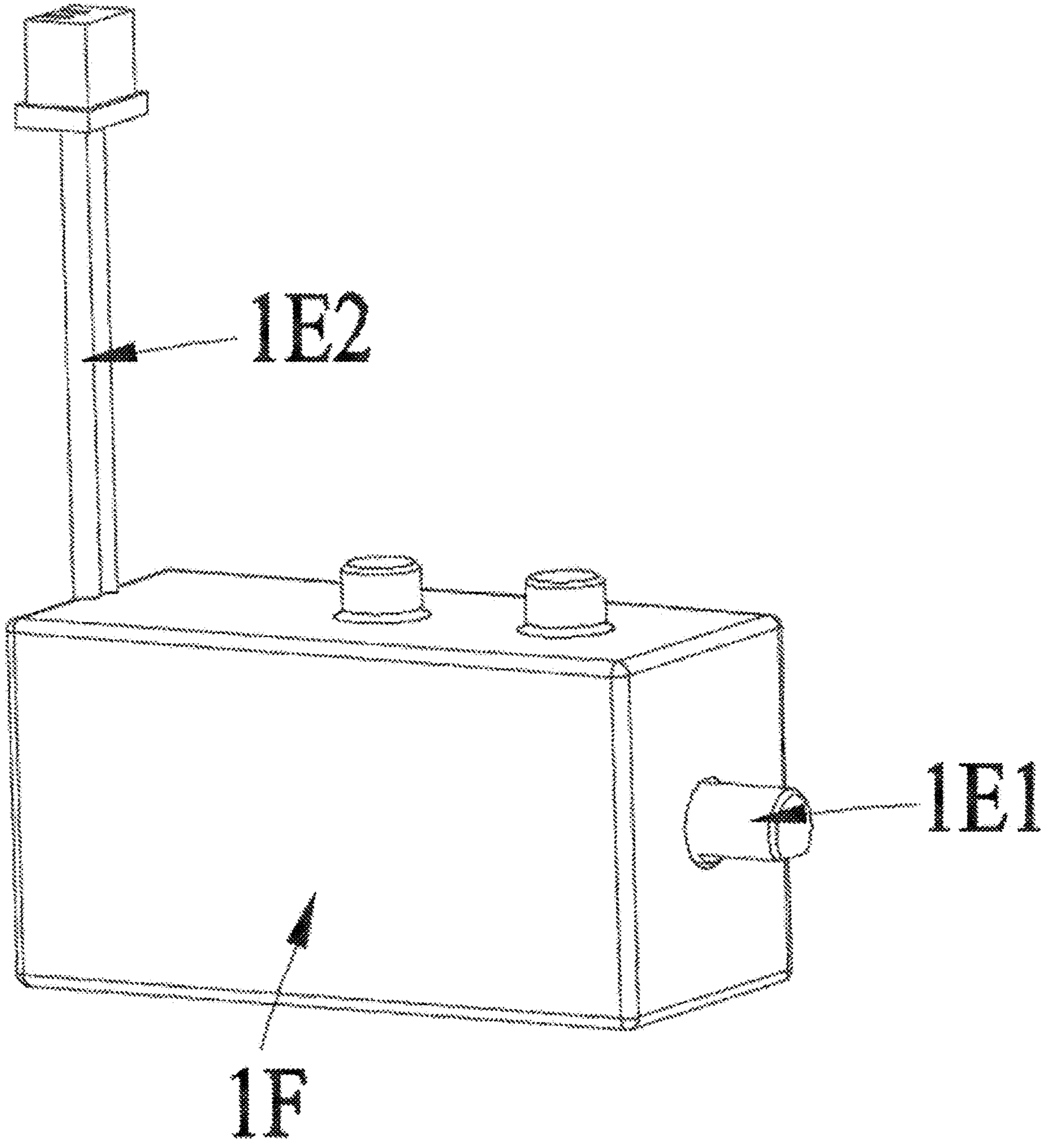
FIG. 23 illustrates a motor cover according to various embodiments.

FIG. 23 illustrates a motor cover according to various embodiments. The electronic lock 100 includes a drive motor (not shown) and a motor cover IF, which can be made of stainless steel. When the electronic lock is a padlock, the drive motor can move the lock cylinder to lock or unlock with the shackle. The motor cover IF has an output hole and an input hole. The output shaft 1E1 of the drive motor comes out of the output hole, and there is a sealing ring (not shown) between the opening and the output shaft 1E1. The motor wire 1E2 of the drive motor goes out of the input hole, and the part of the motor wire 1E2 that touches the motor cover IF is sealed with waterproof glue. In this way, the drive motor can work in a closed space, and it can still run well for a long time even if the area around the motor cover IF is under water.

The present invention therefore provides various embodiments and combinations of a power source assembly and an electronic lock that facilitates easy power source replacement. The design of the related structure also enables the power source of the electronic lock to have a great waterproof seal which in turn leads to a longer lifespan and higher reliability of the electronic lock.

While addressing the issues of easy power source replacement and waterproofing of the electronic lock during its use, it is also noted that storage and transportation methods of electronic locks can significantly impact their subsequent usage and lifespan. Currently, there are two common transportation methods. The first involves disassembling the power source from the electronic lock for transport, then reinstalling it when the user is ready to use the electronic lock. The second method involves transporting the smart lock in a low-power mode, ready to be activated into normal working mode at any time.

However, both methods have significant drawbacks. In the first method, the power source is stored separately from the smart lock during transport, making it susceptible to damage. Additionally, improper installation by the user can cause accidental damage to the control circuit and the power source within the smart lock's body, and potentially compromise the lock's sealing function. In the second method, issues such as packaging pressure and manual handling errors during transport can inadvertently end the lock's low-power mode, causing it to enter normal working mode prematurely. This can result in the smart lock reaching the user with a depleted power source or unnecessary power source consumption, thereby shortening its subsequent service life.

The present invention intends to address the aforesaid problems, and provides a method and system of controlling an electronic lock. The term 'electronic lock' is broadly intended to include any type of lockset that uses electrical power in some manner, including but not limited to electronic deadbolts, electronic lever sets, electronic door locksets, and padlocks.

Figure 24:
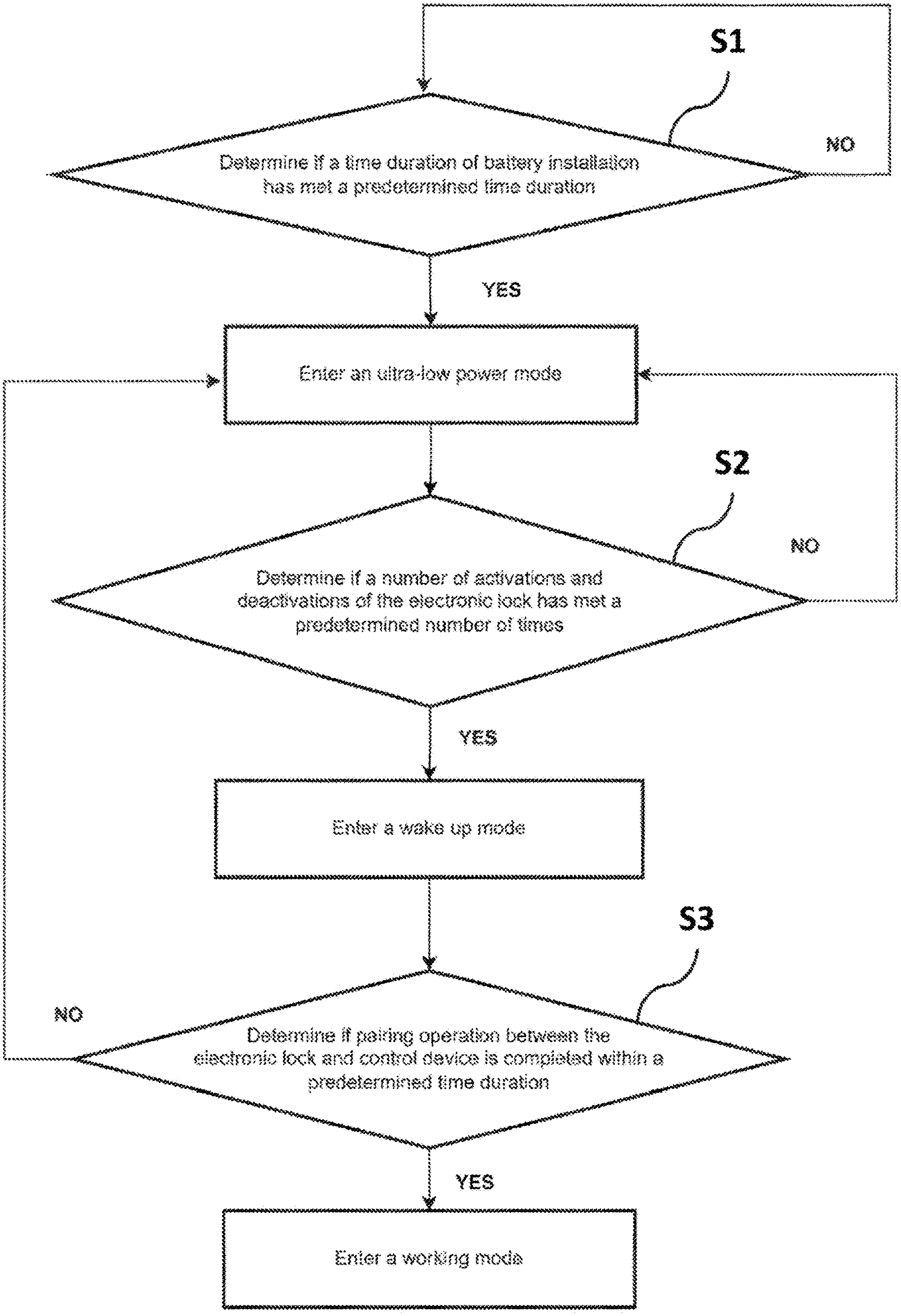
FIG. 24 is a flow chart of a method of controlling an electronic lock according to various embodiments.

FIG. 24 illustrates a flow chart of a method of controlling an electronic lock according to various embodiments. The method includes the following steps:

S1: Determine if a time duration of power source installation in the lock body meets a predetermined installation time duration ("J"), wherein if the time duration of power source installation meets the predetermined installation time duration, the electronic lock enters an ultra-low power mode and proceeds to step S2. If not, the system resets and returns to S1.

S2: Determine if a number of activations and deactivations of the electronic lock in the ultra-low power mode meets a predetermined number of times, wherein if the predetermined number of times are met, the electronic lock enters a wake up mode. In some embodiments, the activations and deactivations of the electronic lock are associated with the locking and unlocking functions, and in one embodiment, the activation is associated with the latching of the shackle for locking and the deactivation is associated with the unlatching of the shackle for unlocking. The number of activations and deactivations denote the total number of times ("K") the shackle has been detected to have latched and unlatched from the lock body. In some embodiments, the total number of times K can be predetermined as desired, and can be from 3 times. In another embodiment, the activations and deactivations of the electronic lock are associated with the charging of the power source via the charging interface on the electronic lock. For example, the activation is associated with plugging a charging cable into the charging interface, and the deactivation is associated with unplugging of the charging cable from the charging interface. The number of activations and deactivations denote the total number of times ("L") the charging cable is detected to have been plugged and unplugged from the Charging interface. When the number of activations and deactivations of the electronic lock has met a predetermined number, the electronic lock enters a wake-up mode. If not, the electronic lock remains in the ultra-low power mode.

S3: In the wake-up mode, the controller determines if a pairing operation for the electronic lock is completed within the predetermined time duration ("M"). If it is, the electronic lock enters a normal working mode. If not, the electronic lock reverts to the ultra-low power mode.

Here, J, K, L, M are positive numbers. Generally, the power consumption ratio of ultra-low power mode, wake-up mode, and normal working mode is preferably set to 0.2:0.6:1.5. This ratio is derived from empirical values obtained from the usage of numerous electronic locks. It effectively reduces power loss in smart lock circuit devices and extends the service life of smart locks.

Therefore, this method for controlling the electronic lock ensures that the electronic lock does not suffer accidental damage during storage and transportation, and prevents accidental wake-ups, reducing unnecessary power source consumption. Simultaneously, based on a pre-installed power source, the ultra-low power mode is set. This eliminates the need for the user to install the power source on the smart lock themselves, reducing potential damage to the smart lock during power source installation and improving power source energy consumption efficiency.

In some embodiments, the electronic lock includes a lock body, a locking mechanism for latching and unlatching for locking and unlocking respectively, a power source, a charging interface for charging the power source, and a controller in communication with the locking mechanism, power source and charging interface.

In one embodiment, the electronic lock 100 includes a lock body having a first shackle recess 41 and a second shackle recess 42 extending from an upper end of the lock body 50. The electronic lock has a shackle 40 that includes a first and second leg, one of which is longer than the other. The shackle recesses 41, 42 receive the first and second legs of a generally U-shaped shackle 40.

Figure 25:
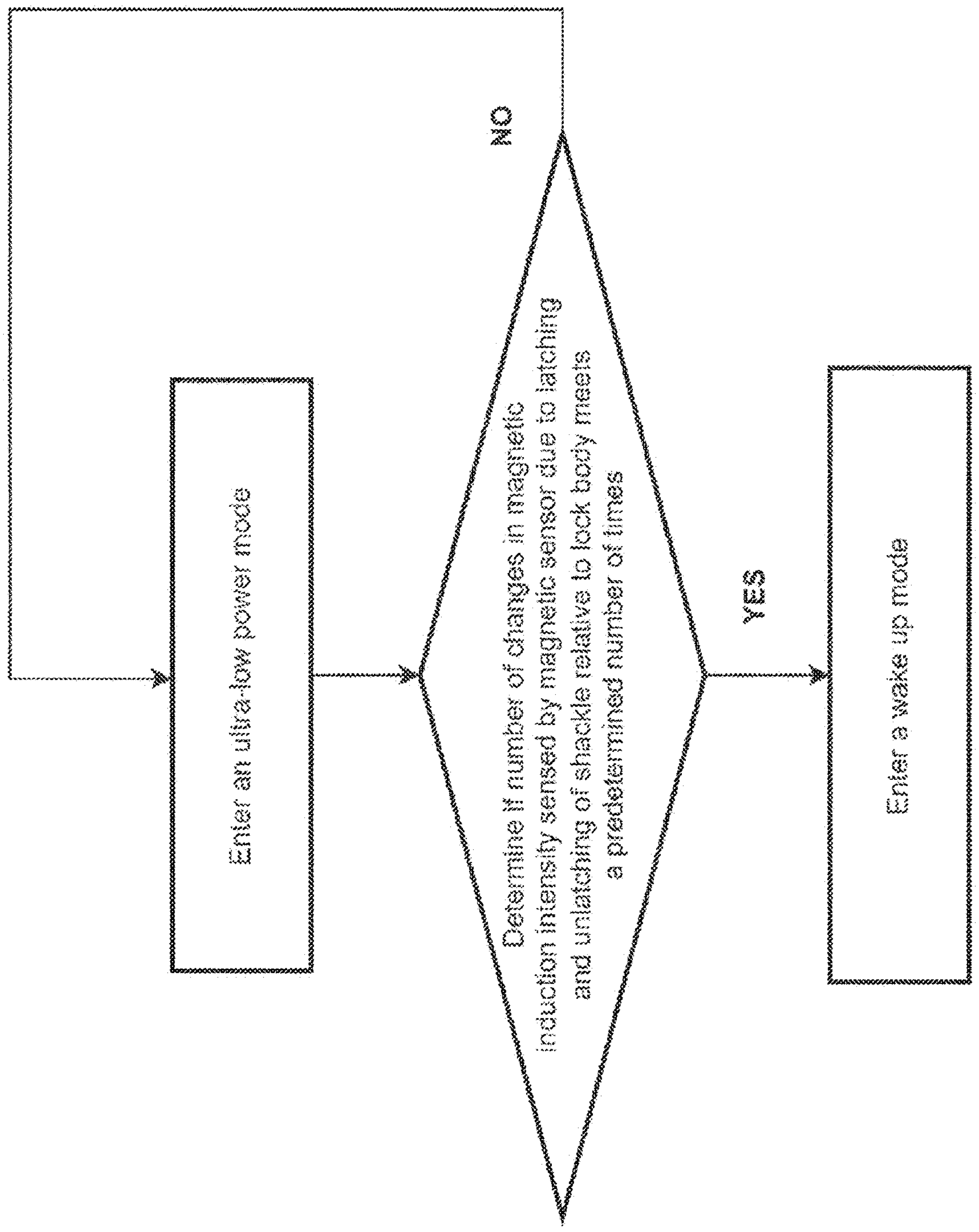
FIG. 25 illustrates a flow chart of a method of controlling the electronic lock via a magnetic sensor according to various embodiments.

FIG. 25 illustrates a flow chart of a method of controlling the electronic lock via a magnetic sensor. In one embodiment, the shackle includes a magnet positioned on the shackle. For example, the magnet can be positioned on an end of the shorter leg of the shackle. A magnetic sensor is also located within the lock body. A detection module, details of which is explained later, is in electrical communication with the magnetic sensor for determining the number of changes in magnetic inductance intensity. When the shackle moves in relation to the lock body during the latching and unlatching process, it drives the magnet to move closer to or further from the lock body. By arranging a magnet on the shackle, and having the magnet move closer to or further from the magnetic sensor with the shackle's movements, the magnetic sensor can accurately determine the number of times the shackle has moved in relation to the lock body. This is based on the number of changes in the sensed magnetic induction intensity.

Referring to FIG. 25, the detection module determines if the number of changes in magnetic induction intensity sensed by the magnetic sensor due to the latching and unlatching of the shackle relative to the lock body meets a predetermined number of times. If the predetermined number of times is met, the electronic lock enters a wake up mode. If not, the electronic lock remains in the ultra-low power mode. In some embodiments, the controller receives the number of latching and unlatching movements of the shackle relative to the lock body has reached the predetermined number of times "K". This step further includes the detection module determining whether the number of changes in magnetic inductance intensity sensed by the magnetic sensor due to the magnet's movement has reached the predetermined number of times 'K'. This method ensures that the control method for the smart lock is highly accurate and sensitive.

Figure 26:
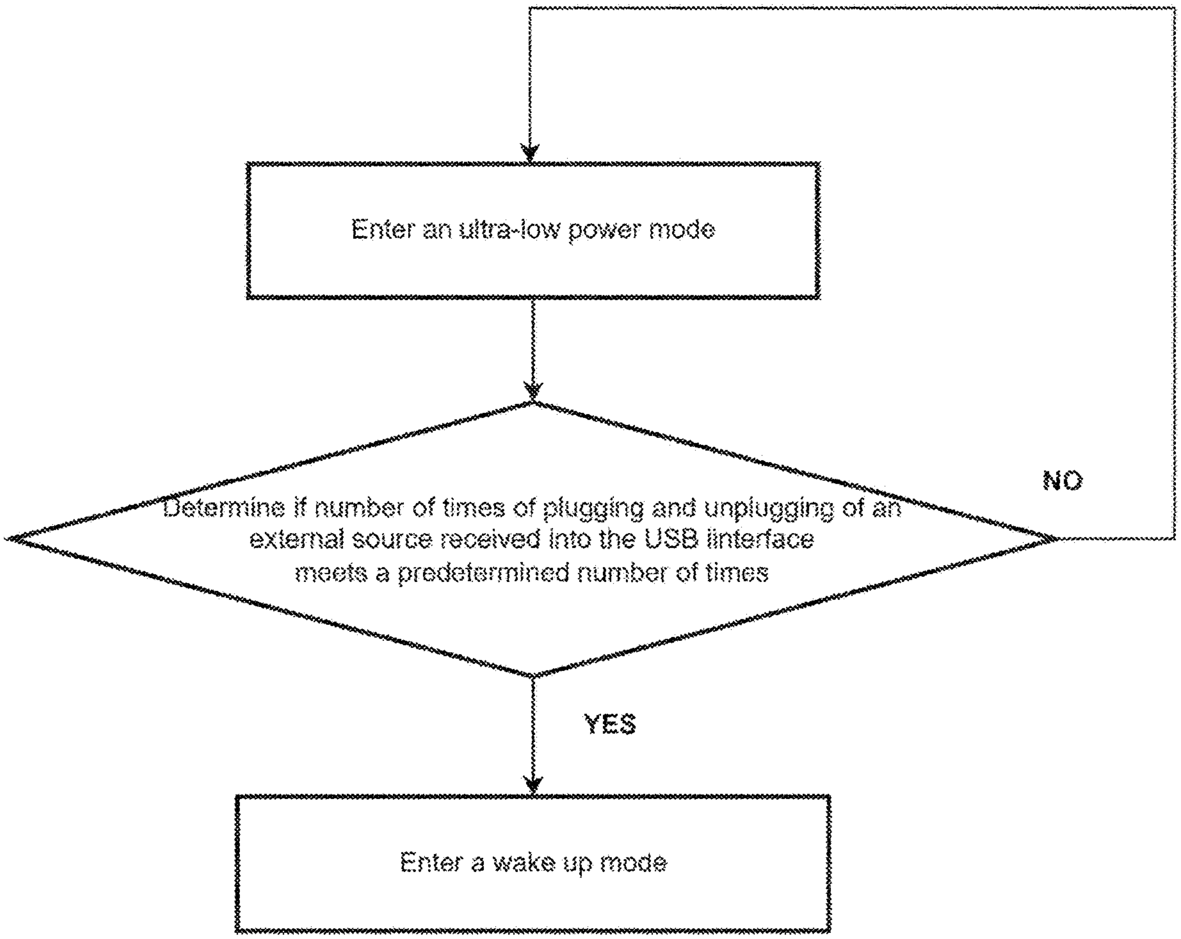
FIG. 26 illustrates a flow chart of a method of controlling an electronic lock via the charging interface according to various embodiments.

FIG. 26 illustrates a flow chart of a method of controlling an electronic lock via the charging interface. An external charging plug or cable could be connected to a flash drive or a power bank, for instance. An external source receiver, capable of receiving signals and/or power, receives a signal source or power source from a USB flash drive or power bank as an external source. Therefore, an external charging plug is used to connect to the charging interface and can be plugged and unplugged multiple times, offering more convenience and speed. In one embodiment, the electronic lock can simultaneously determine the two types of plugging and unplugging times and control it accordingly. Referring to FIG. 26, the detection module in electrical communication with the charging interface determines if the number of pluggings and unpluggings from the charging interface sensed by the detection module meets a predetermined number of times. If the predetermined number of times is met, the electronic lock enters a wake up mode. If not, the electronic lock remains in the ultra-low power mode.

In one embodiment, the lock body is equipped with an input interface including a plurality of buttons. In one embodiment, the plurality of buttons includes several numeric keys and is located on a key circuit board. A pairing operation includes registration operation including key registration, web page registration, and mobile phone APP registration, or connecting to the electronic lock via a wireless communication. As a result, the user has various pairing methods to operate and register the smart lock, making the operation convenient and flexible.

For further specific implementation, 'J', 'K', 'L', and 'M' are set to 1 minute, 3 times, 3 times, and 1 minute, respectively. Through the inventor's repeated experiments and big data analysis, 'J', 'K', 'L', and 'M' are set as the specific values mentioned above. This not only conforms to the actual operation characteristics of users but also avoids misjudgments and misjudgments of related judgments.

The embodiment initially controls the electronic lock to run in ultra-low power mode when it is determined that the power source has been normally installed in the lock body. It then determines the number of activations and deactivations of the electronic lock via the latching and unlatching movements of the shackle relative to the lock body or the plugging and unplugging of an external charging plug and from the charging interface. The determination of the number of activations and deactivations, if it meets a predetermined number, enables the lock to enter the wake-up mode, and if it does not meet the predetermined number, the electronic lock continues to run the ultra-low power mode. Finally, the pairing operation of the electronic lock is determined to be completed within a certain period of time, and if it does not meet the predetermined time duration, the electronic lock continues to run the ultra-low power consumption mode. As a result, it ensures that the electronic lock is protected from accidental damage and unnecessary consumption of the power source when stored in the warehouse or transported as goods.

Figure 27:
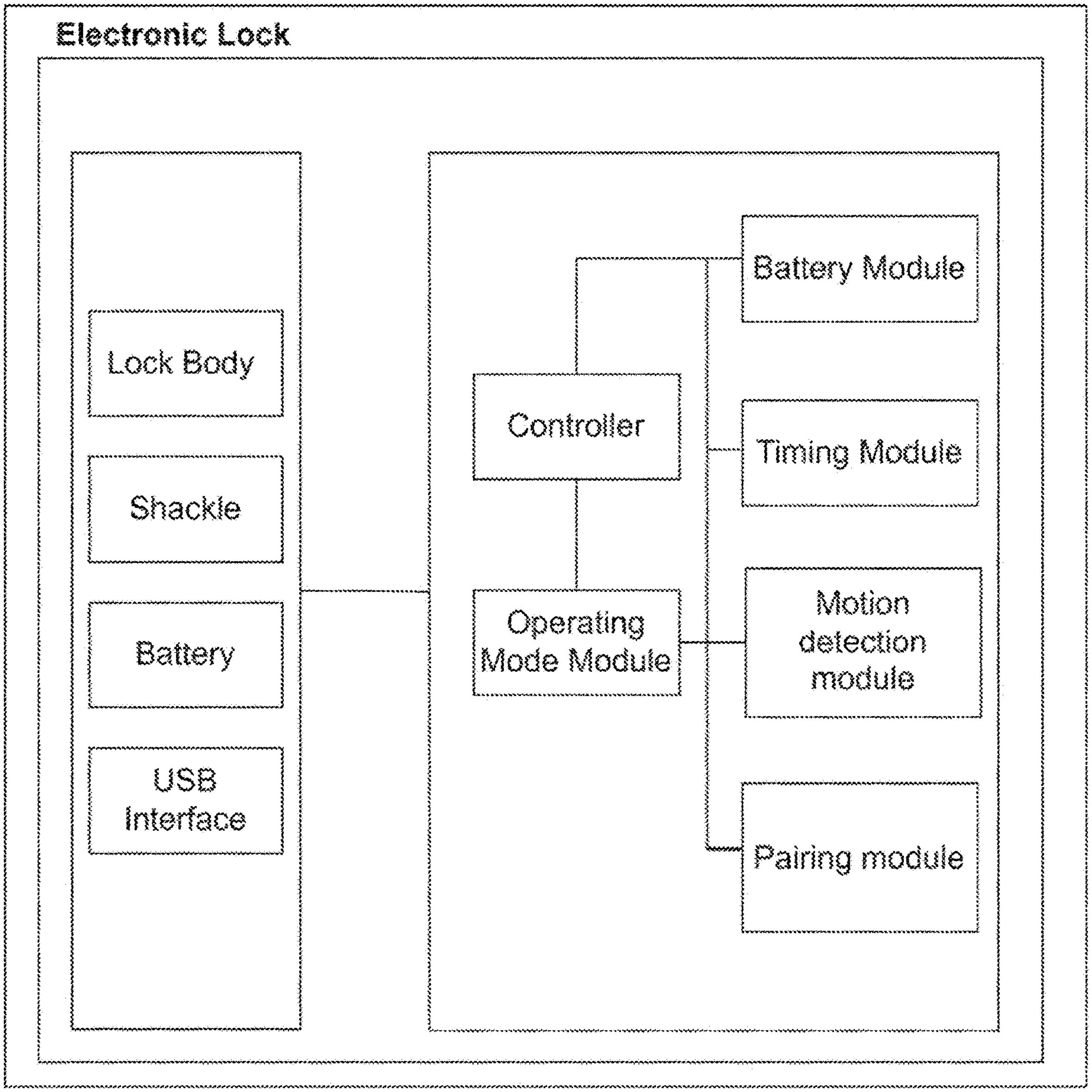
FIG. 27 illustrates a block diagram of a system for controlling an electronic lock.

FIG. 27 illustrates a block diagram of a system for controlling an electronic lock. Referring to FIG. 27, in addition to the previous embodiments, this embodiment also introduces a system for controlling an electronic lock. The electronic lock includes a lock body, a shackle, a power source, a charging interface and a controller in electrical communication with the power source and charging interface. The lock body is equipped with an charging interface, and the shackle is designed for latching and unlatching movements relative to the lock body to enable locking and unlocking.

In various embodiments, the system comprises:

a controller that includes a main control chip (eg. a wireless transmitter and/or a receiver) for Bluetooth communication;

a power source module which receives current from the power source and powers the main control chip;

a timing module, which determines if the time duration of the power source installation in the lock body meets or exceeds the predetermined time duration 'J';

a detection module that includes a shackle motion detection module and/or a charging interface detection module. As previously mentioned, the shackle motion detection module compares and determines the number of latching and unlatching movements of the shackle relative to the lock body via detection of magnetic induction intensity. The charging interface detection module compares and determines whether the number of pluggings and unpluggings of the external Charging plug-in relative to the charging interface reaches the predetermined number of times 'L'.

a pairing detection module, which determines the time taken to complete the pairing operation of the electronic lock and whether the time taken is less than or equal to the predetermined time duration 'M'.

an operation mode module, which controls the electronic lock to run in the ultralow power mode based on the determination of the timing module, detection module and the pairing module. It also controls the electronic lock to run in a wake-up mode and ultra-low power mode respectively based on the results of the timing module, detection module and the pairing module.

In an embodiment, a "module" may be understood as any kind of a logic implementing entity, which may be special purpose circuitry or a processor executing software stored in a memory, firmware, or any combination thereof. Thus, in an embodiment, a "module" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "module" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In various embodiments, the power source module, the timing module, the detection module and the pairing detection module are each connected to the signal input terminal of the controller. The operation mode control module is connected to the signal output terminal of the controller.

The system can implement the method of controlling the electronic lock, thereby ensuring that the electronic lock does not suffer accidental damage and accidental wake-up during storage and transportation. It prevents unnecessary power source consumption and avoids the adverse effects of pressing and disassembling the power source by disassembling the machine.

In various embodiments, and as mentioned previously, the shackle is equipped with a magnet positioned in the lock body. The detection module includes a Hall switch sensor and a sensor circuit that is electrically connected with the Hall switch sensor. When the shackle performs latching and unlatching movements relative to the lock body, the magnet is driven to move closer and farther from the Hall switch sensor. The sensor circuit is electrically connected to the controller through the signal connection line. By default, the sensor circuit outputs a low level to the controller. When the magnet is close to the Hall switch sensor, the sensor circuit outputs a high level to the controller. When the magnet is far from the Hall switch sensor, the sensor circuit outputs a low level to the controller.

In various embodiments, the timing module includes a timing circuit, and the power source module contains a power supply circuit. The timing circuit combines a first vibration circuit and a second vibration circuit to provide a clock to the controller. The power supply circuit consists of a ripple filtering and energy storage circuit, an internal power supply circuit, and a reset circuit. The ripple filtering and energy storage circuit delivers the power source's power to the controller. The internal power supply circuit, located within the controller, provides an internal DC-DC power supply. The reset circuit resets the operation after the controller is powered on.

Figure 28:
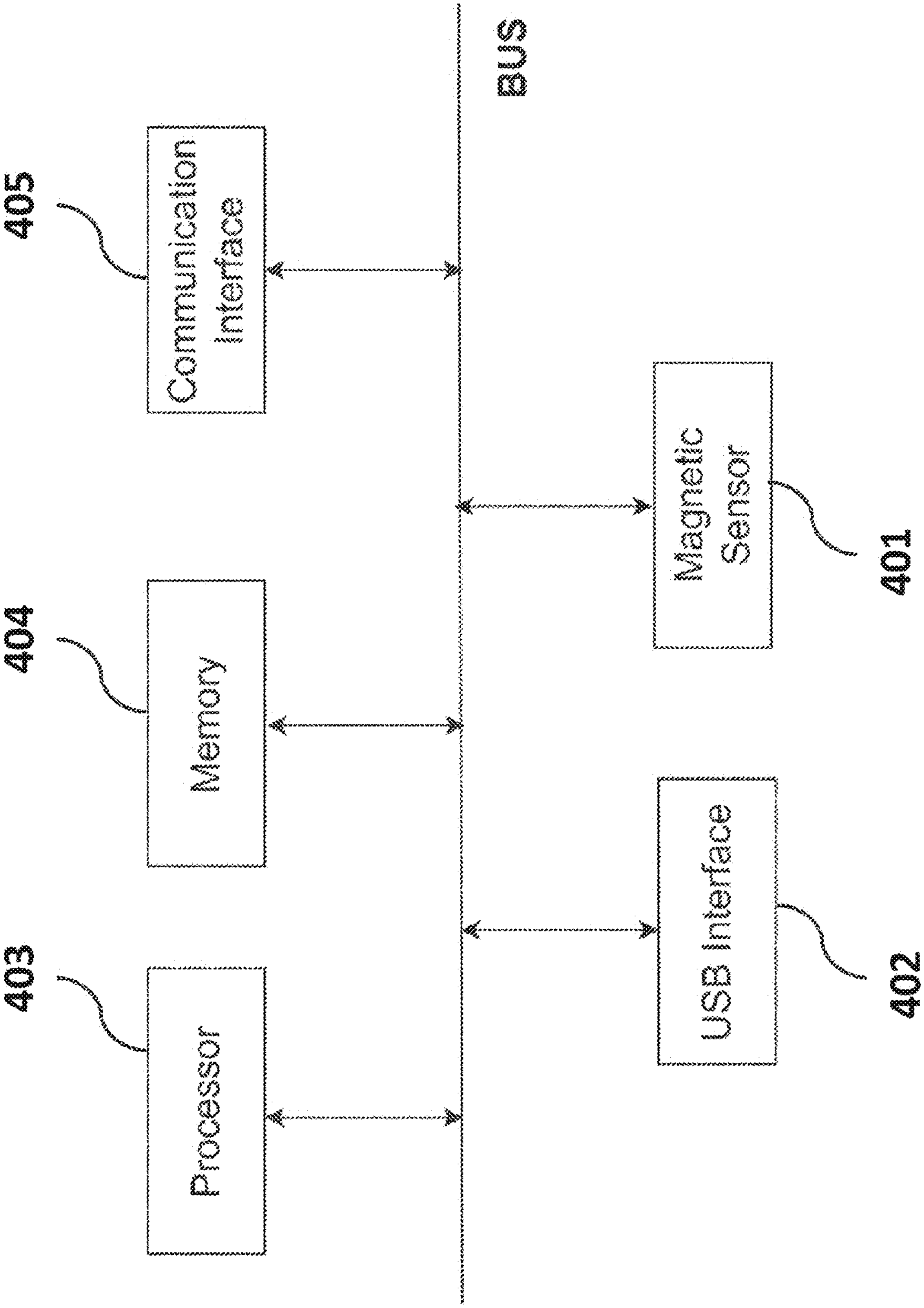
FIG. 28 is a high level overview of an electronic lock according to various embodiments.

FIG. 28 is a high level overview diagram of hardware components in an electronic lock. As shown in FIG. 28, the electronic lock in this embodiment can be implemented in the system and method of controlling the electronic lock. FIG. 28 shows an exemplary embodiment of the hardware structure of the electronic lock, which includes: a lock body, a shackle, a power source, a charging interface 402, at least one processor 403 and at least one memory 404. The memory 404 stores a computer program instruction, which is executed by the processor that is connected to the power source. The processor can implement any of the control methods mentioned above. The processor can also include an integrated master chip and sensor chip D20 as an example. The processor 403 can be a CPU, an ASIC, or one or more integrated circuits for the invention. The memory 404 can store data or instructions in various forms, such as HDDs, floppy disks, flash memory, optical disks, magneto-optical disks, magnetic tapes, USB drives, or a combination of them. The memory 404 can be removable or non-removable, and can be inside or outside the data processing device. In some cases, the memory 404 is a nonvolatile solid-state memory. In some cases, the memory 404 is a ROM, which can be a mask-programmed ROM, a PROM, an EPROM, an EEPROM, an EAROM, a flash memory, or a combination of them.

The electronic lock also includes a communication interface 405 and a bus 410. The communication interface 405 has a Bluetooth communication interface on the main control chip. Referring to FIG. 28, a magnetic sensor 401, a charging interface 402, a processor 403, a memory 404, and a communication interface 405 are connected and communicate through the bus 410. The communication interface 405 is mainly for communication between different modules, devices, units, and/or devices in this invention. The bus 410 has hardware, software, or both that connect the parts of the smart lock. For example, buses can be AGP or other graphics buses, EISA buses, FSBs, HT interconnects, ISA buses, unlimited bandwidth interconnect, LPC bus, memory bus, MCA bus, PCI bus, PCI-X bus, SATA bus, VLB bus, or other suitable bus or a combination of them. The bus 410 can have one or more buses. The invention can use any suitable bus or interconnection, not just the one shown here.

The electronic lock includes the communication interface 405 and the bus 410. The communication interface includes a Bluetooth communication interface on the main control chip Ul. The bus 410 connects and allows communication between a magnetic sensor 401, a charging interface 402, a processor 403, a memory 404, and a communication interface 405, as shown in FIG. 28. The communication interface 405 is used for communication among various modules, devices, units, and/or devices in this invention. The bus 410 consists of hardware, software, or both that link the components of the smart lock. For example, buses can be AGP or other graphics buses, EISA buses, FSBs, HT interconnects, ISA buses, unlimited bandwidth interconnect, LPC bus, memory bus, MCA bus, PCI bus, PCI-X bus, SATA bus, VLB bus, or other appropriate bus or a combination of them. The bus 410 can be one or more buses. The invention is not limited to the bus shown here, but can use any suitable bus or interconnection.

In various embodiments, the controller is equipped with a Bluetooth module for connecting with the App on a control device (for example, a mobile device). A pairing operation includes connecting the electronic lock with the control device, and registration operations via key-button registration, web registration, and mobile app registration. The lock body includes a key circuit board that is electrically connected to the key. The pairing module includes a registration determination circuit that is electrically connected to the key circuit board. The registration determination circuit comprises a Bluetooth receiving circuit and a local input circuit. The local input circuit receives the registration information entered by the user via the key and transmits it to the controller. The Bluetooth receiving circuit receives the registration information entered by the user through the webpage or mobile phone APP via Bluetooth communication and transmits it to the controller. In one embodiment, the chip model of the main control chip is nRF52832, which can support related wireless communication protocols such as low-power Bluetooth, ANT, etc.

A variety of control devices may be employed in accordance with the invention. The control devices may include mobile devices, smart phones, smart devices, tablets, PCs, digital home clients such as personal computers and media centers, and other control devices. Generally, control device may include virtually any portable computing device capable of receiving and sending a message over a network, such as network, or the like. A control device may also be described generally as a client device that is configured to be portable. A control device may have the capability of connecting to a network using wireless technology, wired technology, or a combination of both wired and wireless technologies. Thus, a control device may include virtually any portable computing device capable of connecting to another computing device and receiving information. Such devices include portable devices such as cellular telephones, smart phones, display pagers, radio frequency (RF) devices, infrared (IR) devices, Personal Digital Assistants (PDAs), handheld computers, sensors, laptop computers, wearable computers, tablet computers, integrated devices combining one or more of the preceding devices, and the like. As such, control device typically ranges widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the specification.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for controlling an electronic lock when in storage and transport, the electronic lock including a lock body, a locking mechanism for latching and unlatching relative to the lock body for locking and unlocking respectively, a power source, a charging interface for charging the power source, and a controller in communication with the locking mechanism, power source and the charging interface, wherein the method includes:

determining if a time duration of the power source in the lock body meets a first predetermined time duration, wherein if the time duration of the power source meets the first predetermined time duration, the electronic lock enters an ultra-low power mode;

determining if a number of activation and deactivation of the electronic lock in the ultra-low power mode meets a predetermined number of times; wherein if the predetermined number of times are met, the electronic lock enters a wake up mode, wherein the electronic lock further includes a shackle for latching and unlatching relative to the lock body, wherein the activation is associated with latching of the shackle for locking and the deactivation is associated with the unlatching of the shackle for unlocking;

determining if a pairing operation between the electronic lock and a control device is completed within a second predetermined time duration, wherein if the second predetermined time duration is met, the electronic lock enters a work mode.

2. The method according to claim 1, wherein the activation is associated with plugging an external charging plug in communication with an external source receiver into the charging interface, and the deactivation is associated with unplugging the external charging plug from the charging interface.

3. The method according to claim 2, further including a detection module in communication with the charging interface for determining if the number of activations and deactivations meets the predetermined number of times, wherein the predetermined number of times is associated with the number of plugging and unplugging of the external charging plug into and from the charging interface respectively.

4. The method according to claim 1, wherein the electronic lock further comprises a magnet located on the shackle, a magnetic sensor located within the lock body for detecting a change in magnetic inductance intensity when the shackle moves relative to the lock body; and a detection module in communication with the magnetic sensor for determining the number of activations and deactivations associated with the latching and unlatching of the shackle respectively, wherein a change in magnetic inductance intensity is associated with the number of activations and deactivations.

5. The method according to claim 1, further comprising a pairing detection module in communication with the controller for determining if the time taken to complete the pairing operation of the electronic lock is less than or equal to the second predetermined time duration.

6. The method according to claim 1, wherein the first and second predetermined time duration is 1 minute and the predetermined number of times is 3.

7. An electronic lock comprising a lock body, a shackle for latching and unlatching relative to the lock body for locking and unlocking respectively, a power source, a charging interface for charging the power source, and a controller in communication with the locking mechanism, the power source and charging interface, at least one processor and at least one memory, the memory storing computer program instructions, the power source electrically connected to the processor, when the computer program instructions are executed by the processor to implement the method as claimed in claim 1.

8. A system for controlling an electronic lock when in storage and transport, the electronic lock including a lock body, a locking mechanism for latching and unlatching relative to the lock body for locking and unlocking respectively, a power source, a charging interface for charging the power source, and a controller in communication with the locking mechanism, the power source and charging interface, wherein the system comprises:

a power source module in communication with the power source and a timing module, wherein the timing module configured to determine a first time duration of power source in the lock body; a detection module configured to determine a number of activation and deactivation of the electronic lock, wherein the electronic lock further includes a shackle for latching and unlatching relative to the lock body, wherein the activation is associated with latching of the shackle for locking and the deactivation is associated with the unlatching of the shackle for unlocking;

a pairing detection module configured to determine a second time duration for a pairing operation between the electronic lock and a control device;

an operation mode module configured to cause the electronic lock to enter an ultra-low power mode, a wake up mode and a working mode based on the determination of the timing module, detection module and the pairing detection module;

a controller in communication with the timing module, the detection module, the pairing detection module and the operation mode module, the controller configured to: determine if the first time duration of the power source in the lock body meets a first predetermined time duration, wherein if the time duration of the power source meets the first predetermined time duration, the electronic lock enters an ultra-low power mode;

determine if the number of activations and deactivations of the electronic lock meets a pre determined number of times, wherein if the predetermined number of times are met, the electronic lock enters a wake up mode; and determine if the second time duration for the pairing operation is completed within a second predetermined time duration, wherein if the second predetermined time duration is met, the electronic lock enters a work mode.

9. The system according to claim 8, wherein the activation is associated with plugging an external charging plug in communication with an external source receiver into the charging interface, and the deactivation is associated with unplugging the external charging plug from the charging interface.

10. The system according to claim 9, wherein the detection module is in communication with the charging interface for determining if the number of activation and deactivation meets the predetermined number of times, wherein the predetermined number of times is associated with the number of plugging and unplugging of the external charging plug into and from the charging interface respectively.

11. The system according to claim 8, wherein the electronic lock further comprises: a magnet located on the shackle, a magnetic sensor located within the lock body for detecting a change in magnetic inductance intensity when the shackle moves relative to the lock body; wherein the detection module in communication with the magnetic sensor is configured to determine the number of activation and deactivation associated with the latching and unlatching of the shackle respectively, wherein a change in magnetic inductance intensity is associated with the number of activation and deactivation.

12. The system according to claim 8, wherein the first and second predetermined time duration is 1 minute and the predetermined number of times is 3.

13. The system according to claim 8, wherein the controller comprises a signal input end and a signal output end, wherein the power source module, the timing module, the detection module and the pairing operation module are connected to the signal input end, and the operation mode module is connected to the signal output end.

14. The system according to claim 8, wherein the electronic lock further includes a frame including a base having four walls extending upwardly from the base to define a compartment for receiving a power source enclosure, each wall having a top edge and a bottom edge, wherein the bottom edge is connected to one of the sides of the base, and the top edge includes a recess that extends longitudinally along the top edge so that the recess extends along the perimeter of the top edge of the frame;

a compartment pad including a projection configured to provide a corresponding fit for the recess;

a compartment cover configured to be placed over the compartment pad, wherein the compartment pad, the compartment cover and the frame includes a plurality of aligned holes configured to secure the compartment pad and compartment cover to the frame via fasteners.

15. The system according to claim 8, wherein the lock body further comprises:

a front cover and a rear cover that is removably detachable from the front cover to form a hollow cavity within; a central frame disposed within the hollow cavity, the central frame having a recess and a circumferential groove around the recess;

an input interface frame having a top surface and a bottom surface, the input interface frame including a first circumferential projection on the bottom surface that corresponds to fit the circumferential groove.

* * * * *